US012770786B2

(12) United States Patent
Nishikori

(10) Patent No.: US 12,770,786 B2
(45) Date of Patent: Oct. 20, 2026

(54) MUTILAYER CERAMIC CAPACITOR

(71) Applicant: Murata Manufacturing Co., Ltd., Nagaokakyo (JP)

(72) Inventor: Makoto Nishikori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 147 days.

(21) Appl. No.: 18/789,751

(22) Filed: Jul. 31, 2024

(65) Prior Publication Data

US 2024/0420891 A1 Dec. 19, 2024

Related U.S. Application Data

(63) Continuation of application No. PCT/JP2023/022466, filed on Jun. 16, 2023.

(51) Int. Cl.

*H01G 4/012* (2006.01)
*H01G 4/232* (2006.01)
*H01G 4/30* (2006.01)
*H01G 4/12* (2006.01)

(52) U.S. Cl.

CPC ........... *H01G 4/012* (2013.01); *H01G 4/2325* (2013.01); *H01G 4/30* (2013.01); *H01G 4/1209* (2013.01)

(58) Field of Classification Search

CPC ........ H01G 4/012; H01G 4/2325; H01G 4/30; H01G 4/1209; H01G 4/12; H01G 4/1227; H01G 4/232

See application file for complete search history.

(56) References Cited

U.S. PATENT DOCUMENTS 8,335,072 B1 * 12/2012 Kim ....................... H01G 4/012 361/311
11,476,046 B2 * 10/2022 Tanaka ................... H01G 4/005
(Continued)

FOREIGN PATENT DOCUMENTS

JP H1097942 A 4/1998
JP 2003243249 A 8/2003
(Continued)

OTHER PUBLICATIONS

Translation of JP '097 (Year: 2019).*
(Continued)

*Primary Examiner* — Dion R. Ferguson
(74) *Attorney, Agent, or Firm* — Keating & Bennett, LLP

(57) ABSTRACT

A multilayer ceramic capacitor includes first and second counter portions. The first counter portion includes a first middle region and first and second regions. The second counter portion includes a second middle region, third and fourth regions. The first middle region has coverage higher than coverage of the first and second regions. The second middle region has coverage higher than coverage of the third and fourth regions. A dimension of each of the first and second middle regions is shorter than a distance between first and second external electrodes. A dimension at a center of an exposed portion in the length direction is longer that a maximum distance in a lamination direction between first and second covered portions, and shorter than a maximum distance in the lamination direction between both sides of the first and second external electrodes.

20 Claims, 14 Drawing Sheets

(56) References Cited

U.S. PATENT DOCUMENTS

| | | | | |
|---|---|---|---|---|
| 2012/0307417 | A1* | 12/2012 | Kim | H01G 4/012 361/321.2 |
| 2013/0002388 | A1 | 1/2013 | Kim et al. | |
| 2014/0126111 | A1 | 5/2014 | Kim et al. | |
| 2015/0116896 | A1* | 4/2015 | Inazuka | H01G 4/30 361/301.4 |
| 2016/0225526 | A1* | 8/2016 | Endo | H01G 4/30 |
| 2018/0268999 | A1 | 9/2018 | Shimada et al. | |
| 2021/0104364 | A1 | 4/2021 | Okuda | |
| 2021/0166874 | A1* | 6/2021 | Tanaka | H01G 4/005 |
| 2022/0148807 | A1* | 5/2022 | Ishizuka | H01G 4/248 |
| 2022/0406527 | A1 | 12/2022 | Hirai | |
| 2024/0420888 | A1* | 12/2024 | Nishikori | H01G 4/005 |
| 2024/0420891 | A1* | 12/2024 | Nishikori | H01G 4/012 |
| 2024/0420892 | A1* | 12/2024 | Nishikori | H01G 4/012 |
| 2025/0299880 | A1* | 9/2025 | Nakanishi | H01G 4/005 |

FOREIGN PATENT DOCUMENTS

| | | | | | |
|---|---|---|---|---|---|
| JP | 2012253337 | A | * | 12/2012 | H01G 4/012 |
| JP | 2013016770 | A | | 1/2013 | |
| JP | 2014093517 | A | | 5/2014 | |
| JP | 2014232898 | A | * | 12/2014 | H01G 4/012 |
| JP | 2015026841 | A | | 2/2015 | |
| JP | 2018152547 | A | | 9/2018 | |
| JP | 2019004097 | A | * | 1/2019 | |
| JP | 2021061302 | A | | 4/2021 | |
| JP | 2022191909 | A | | 12/2022 | |
| KR | 20140041235 | A | * | 4/2014 | H05K 1/181 |
| KR | 101452079 | B1 | * | 10/2014 | H01G 4/30 |
| KR | 20150048046 | A | * | 5/2015 | H01G 4/30 |
| KR | 20180004690 | A | * | 1/2018 | H01G 4/012 |
| KR | 102406443 | B1 | * | 6/2022 | H01G 4/1218 |

OTHER PUBLICATIONS

International Search Report in PCT/JP2023/022466, mailed Sep. 12, 2023, 3 pages.

Written Opinion in PCT/JP2023/022466, mailed Sep. 12, 2023, 6 pages.

Official Communication issued in International Patent Application No. PCT/JP2024/015241 mailed on Jun. 18, 2024, 10 pages.

Nishikori, "Multilayer Ceramic Capacitor", U.S. Appl. No. 18/795,352, filed Aug. 6, 2024.

Nishikori, "Multilayer Ceramic Capacitor", U.S. Appl. No. 18/796,371, filed Aug. 7, 2024.

Nishikori, "Multilayer Ceramic Capacitor", U.S. Appl. No. 19/410,173, filed Dec. 5, 2025.

* cited by examiner

MUTILAYER CERAMIC CAPACITOR

CROSS REFERENCE TO RELATED APPLICATIONS

This application claims the benefit of priority to PCT Application No. PCT/JP2023/022466 filed on Jun. 16, 2023. The entire contents of this application are hereby incorporated herein by reference.

BACKGROUND OF THE INVENTION

1. Field of the Invention

The present invention relates to multilayer ceramic capacitors.

2. Description of the Related Art

In the related art, multilayer ceramic capacitors functioning as multilayer ceramic electronic components have been known. In general, multilayer ceramic capacitors each include a multilayer body in which a plurality of dielectric layers and a plurality of internal electrode layers are alternately laminated, and external electrodes provided on both end surfaces of the multilayer body and connected to the internal electrode layers (see, for example, Japanese Unexamined Patent Application, Publication No. 2003-243249).

The multilayer ceramic capacitors are required to be reduced in size and to be improved in capacitance. However, it is difficult to achieve both of these characteristics.

SUMMARY OF THE INVENTION

Example embodiments of the present invention provide multilayer ceramic capacitors each able to increase capacitance without increasing the size of the multilayer ceramic capacitor.

An example embodiment of the present invention provides a multilayer ceramic capacitor including a multilayer body including a plurality of dielectric layers that are laminated, a first main surface and a second main surface opposed to each other in a lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction, a plurality of first internal electrode layers each on a corresponding one of the plurality of dielectric layers and each exposed at the first end surface, a plurality of second internal electrode layers each on a corresponding one of the plurality of dielectric layers and each exposed at the second end surface, a first external electrode on the first end surface and connected to the plurality of first internal electrode layers, and a second external electrode on the second end surface and connected to the plurality of second internal electrode layers. The multilayer body includes exposed portions each exposed from the first external electrode and the second external electrode, first covered portions each covered by the first external electrode, and second covered portions each covered by the second external electrode. Each of the plurality of first internal electrode layers includes a first counter portion opposed to a corresponding one of the plurality of second internal electrode layers and a first extension portion extending from the first counter portion toward the first end surface and exposed at the first end surface. Each of the plurality of second internal electrode layers includes a second counter portion opposed to a corresponding one of the plurality of first internal electrode layers and a second extension portion extending from the second counter portion toward the second end surface and exposed at the second end surface. The first counter portion includes a first region adjacent to the first end surface, a second region adjacent to the second end surface, and a first middle region located between the first region and the second region and including coverage higher than coverage of the first region and coverage of the second region. The second counter portion includes a third region adjacent to the second end surface, a fourth region adjacent to the first end surface, and a second middle region located between the third region and the fourth region and including coverage higher than coverage of the third region and coverage of the fourth region. A dimension of the first middle region in the length direction is shorter than a distance between the first external electrode and the second external electrode. A dimension of the second middle region in the length direction is shorter than the distance between the first external electrode and the second external electrode. A dimension in the lamination direction at a center of each of the exposed portions in the length direction is longer than a maximum distance in the lamination direction between surfaces adjacent to the first main surface and the second main surface of each of the first covered portions and the second covered portions, and shorter than a maximum distance in the lamination direction between a first main surface-side surface and a second main surface-side surface of each of the first external electrode and the second external electrode, the first main surface-side surface and the second main surface-side surface each functioning as an outermost surface and being exposed to outside.

According to example embodiments of the present invention, it is possible to provide multilayer ceramic capacitors that are each able to increase the capacitance without increasing the size of the multilayer ceramic capacitor.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention are described in detailed below with reference to the drawings.

Figure 1:
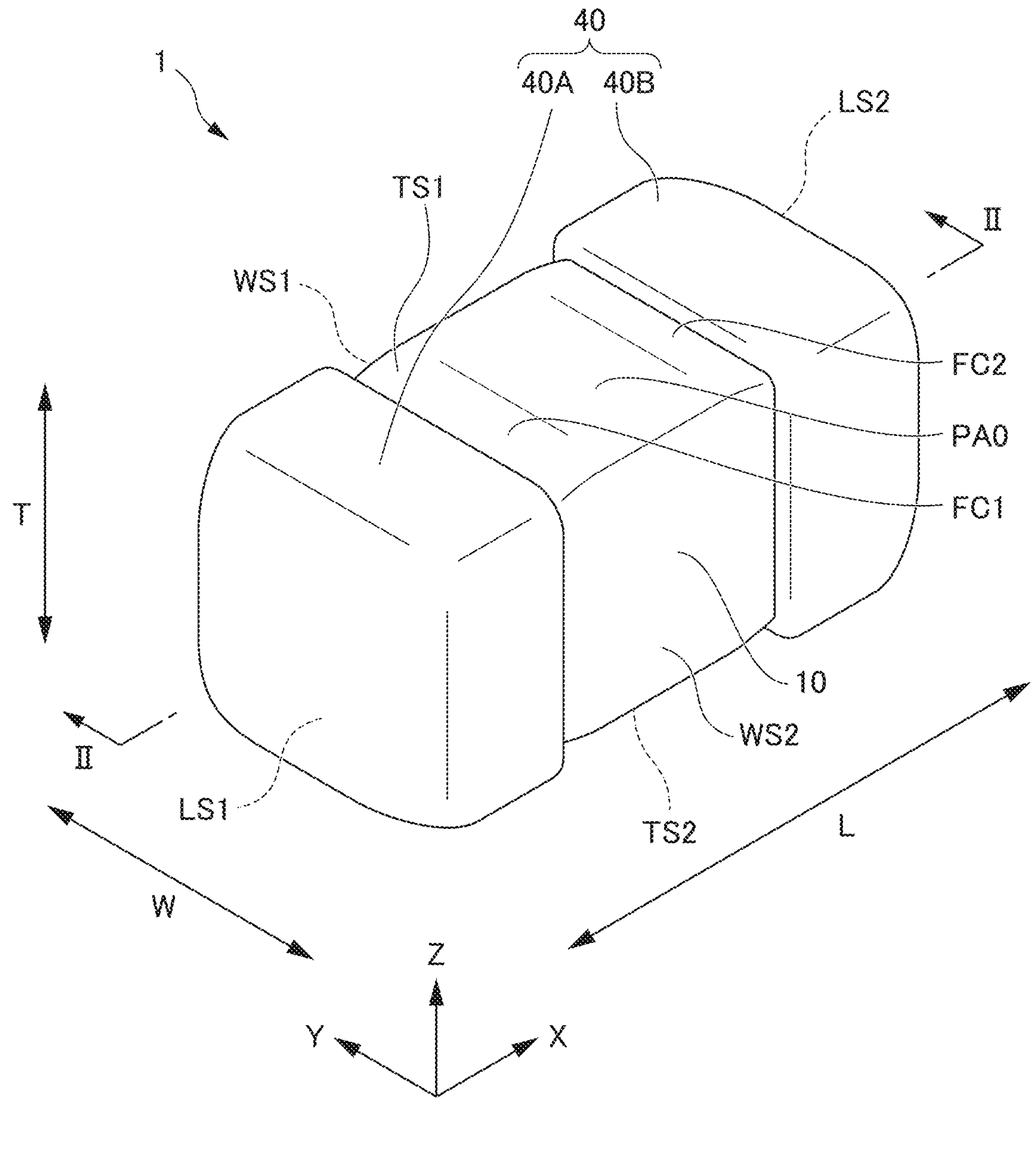
FIG. 1 is an external perspective view of a multilayer ceramic capacitor according to an example embodiment of the present invention.
Figure 2A:
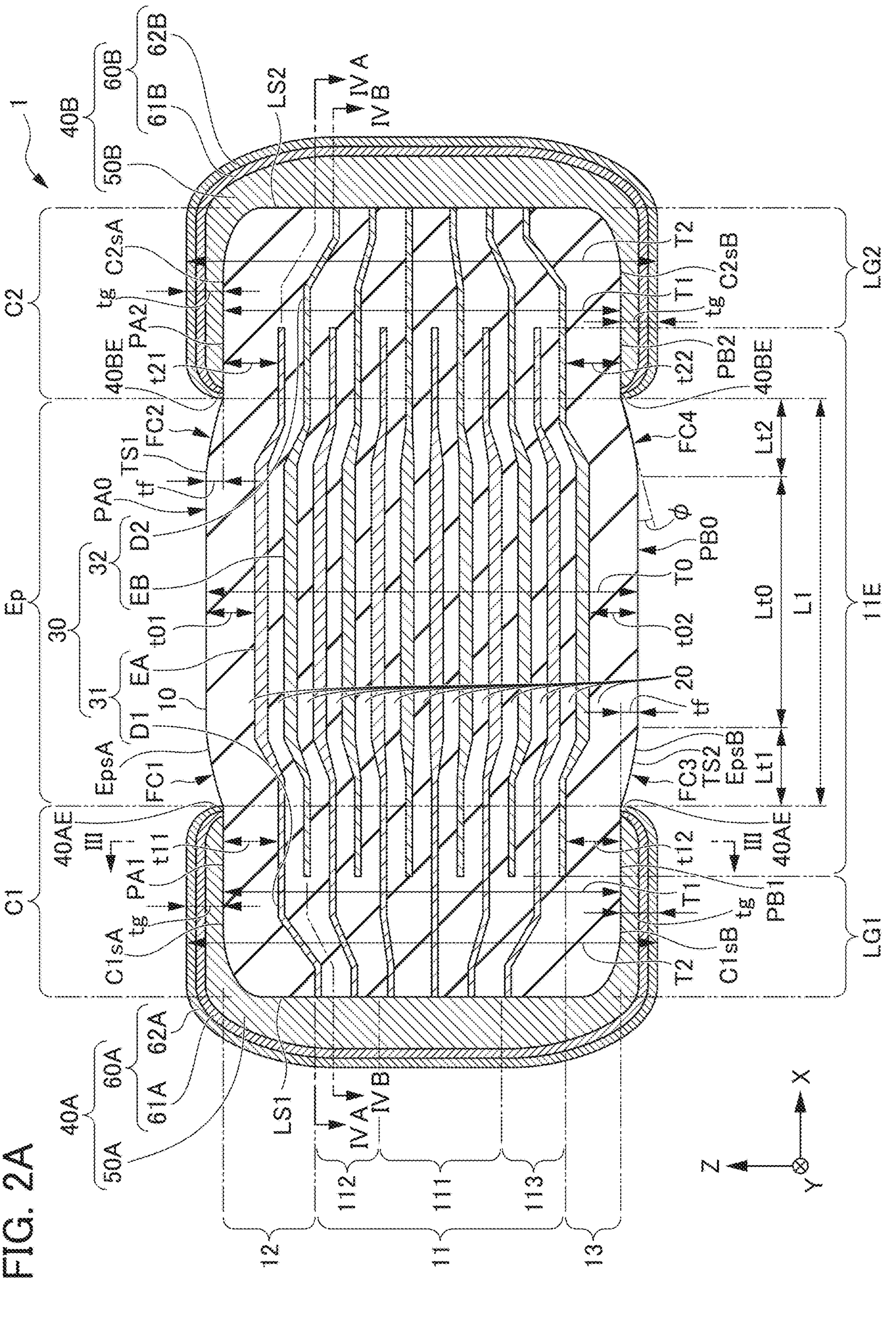
FIG. 2A is a cross-sectional view taken along the line II-II of FIG. 1, and is a view for explaining a schematic configuration of a multilayer body.
Figure 2B:
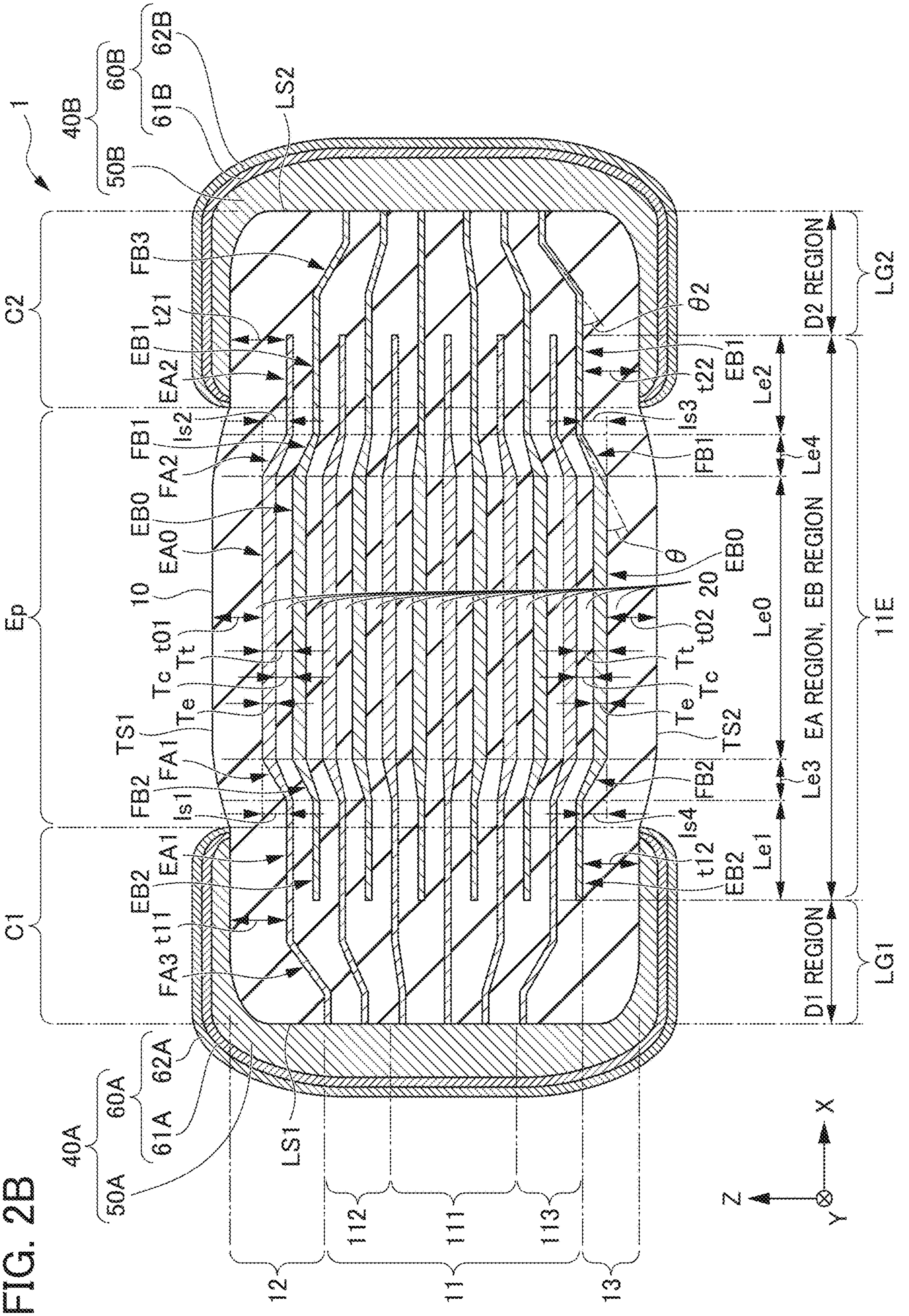
FIG. 2B is a cross-sectional view taken along the line II-II of FIG. 1, and is a view for explaining details of internal electrode layers of the multilayer body.
Figure 3:
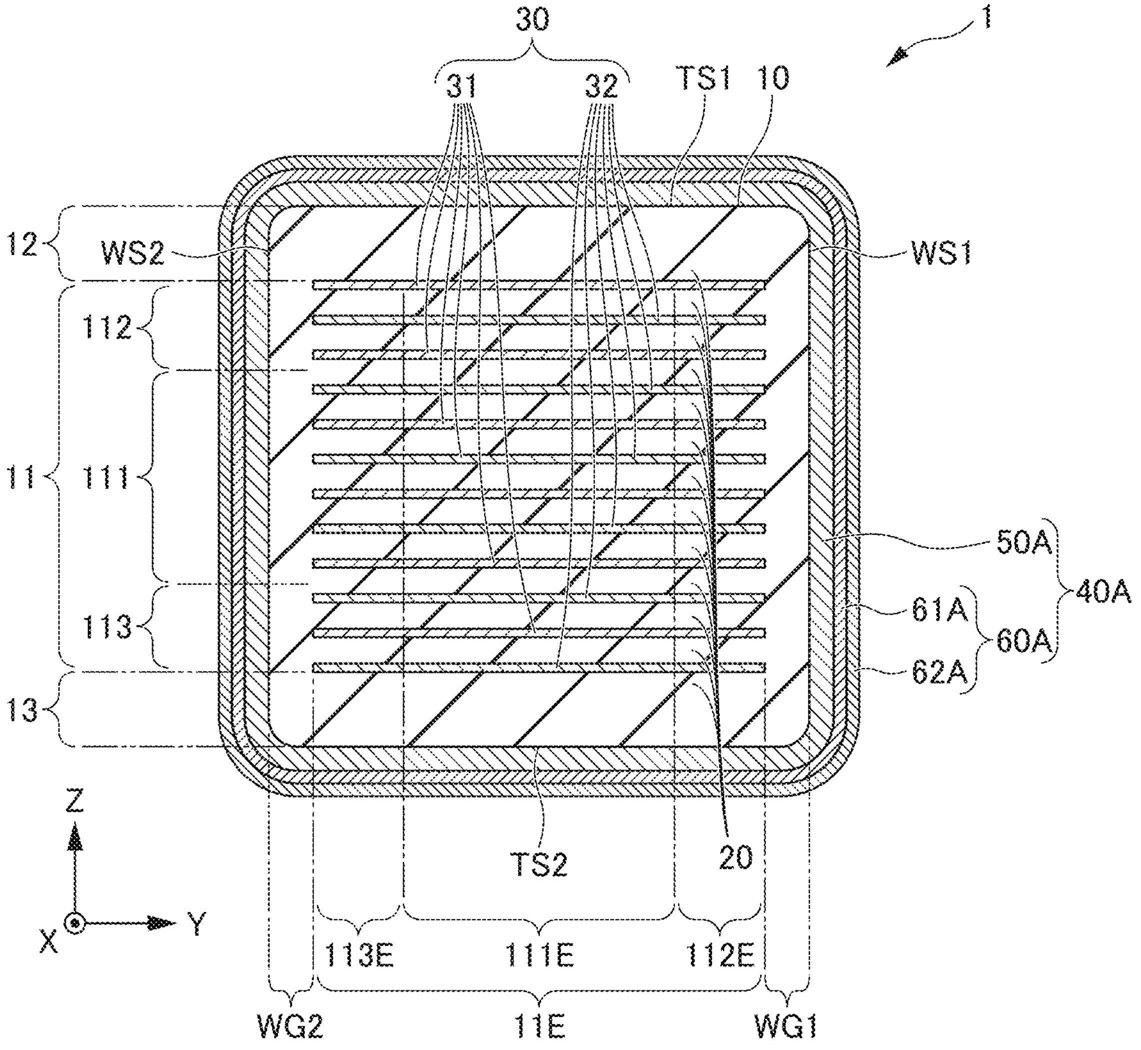
FIG. 3 is a cross-sectional view taken along line III-III of FIG. 2A.
Figure 4A:
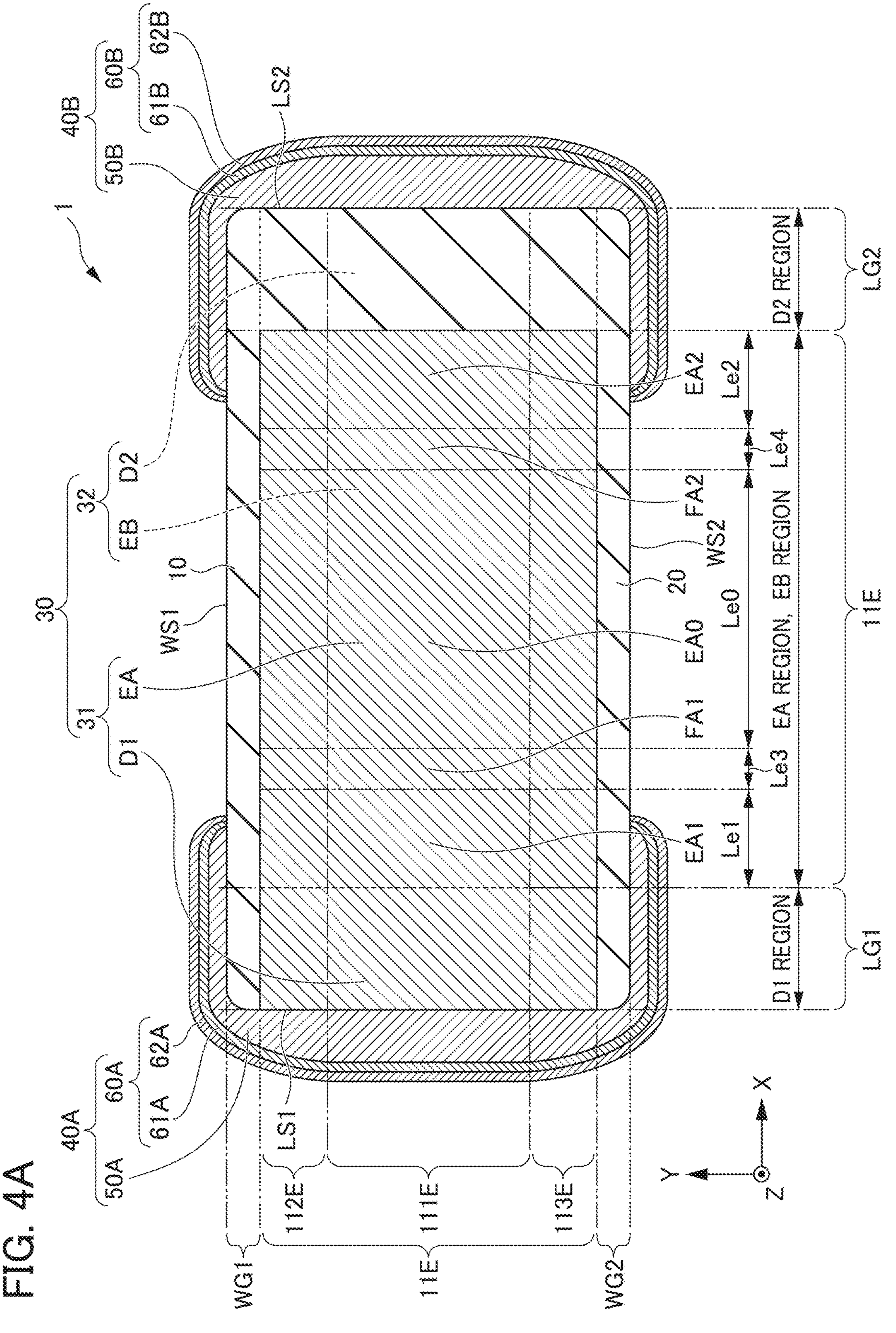
FIG. 4A is a cross-sectional view taken along the line IVA-IVA of FIG. 2A, and is a cross-sectional view taken along a first internal electrode layer.
Figure 4B:
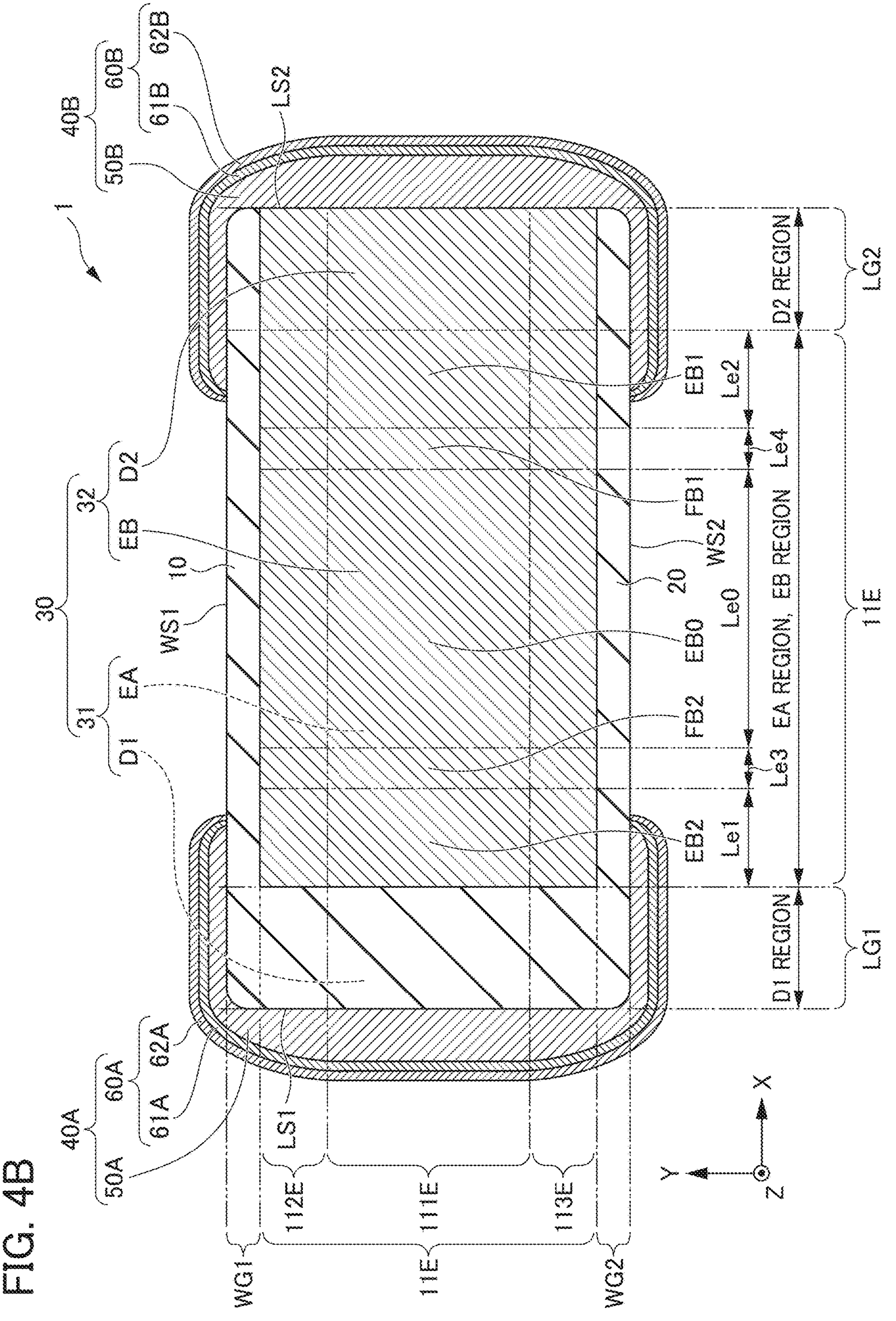
FIG. 4B is a cross-sectional view taken along line IVB-IVB of FIG. 2A, and is a cross-sectional view taken along a second internal electrode layer.

A multilayer ceramic capacitor 1 as a multilayer ceramic electronic component according to an example embodiment of the present invention will be described with reference to the drawings. FIG. 1 is an external perspective view of a multilayer ceramic capacitor 1 according to an example embodiment of the present invention. FIG. 2A is a cross-sectional view taken along the line II-II of FIG. 1, and is a view for explaining a schematic configuration of a multilayer body. FIG. 2B is a cross-sectional view taken along the line II-II of FIG. 1, and is a view for explaining details of an internal electrode layer of the multilayer body. FIG. 3 is a cross-sectional view taken along the line III-III of FIG. 2A. FIG. 4A is a cross-sectional view taken along the line IVA-IVA of FIG. 2A, and is a cross-sectional view taken along the first internal electrode layer. FIG. 4B is a cross-sectional view taken along the line IVB-IVB of FIG. 2A, and is a cross-sectional view taken along the second internal electrode layer.

In addition, the drawings may be schematically simplified and drawn in order to explain the contents of example embodiments of the present invention, and the drawn elements or the ratio of the dimensions between the elements may not coincide with the ratio of the dimensions described in the specification. In addition, components described in the specification may be omitted in the drawings or may be drawn with the number of components omitted. For example, the number of internal electrode layers shown in FIGS. 2A, 2B, and 3 is twelve for convenience of description. However, this does not indicate the actual number of internal electrode layers 30. Terms used in the present disclosure, such as "parallel", "orthogonal", "same", and the like, and values of lengths and angles, and the like, which specify shapes, geometrical conditions, and degrees thereof, are not limited to strict meanings, and should be construed to include a range in which similar functions can be expected.

As shown in FIG. 1, the multilayer ceramic capacitor 1 according to an example embodiment has a rectangular or substantially rectangular parallelepiped shape. The multilayer ceramic capacitor 1 includes a multilayer body 10 having a rectangular or substantially rectangular parallelepiped shape, and a pair of external electrodes 40 provided at both end portions of the multilayer body 10 and spaced apart from each other.

In FIG. 1, an arrow T indicates a lamination (stacking) direction of the multilayer ceramic capacitor 1 and the multilayer body 10. The lamination direction T is also referred to as a thickness direction and a height direction of the multilayer ceramic capacitor 1 and the multilayer body 10. In FIG. 1, the arrow L indicates a length direction orthogonal or substantially orthogonal to the lamination direction T of the multilayer ceramic capacitor 1 and the multilayer body 10. In FIG. 1, the arrow W indicates a width direction orthogonal or substantially orthogonal to the lamination direction T and the length direction L of the multilayer ceramic capacitor 1 and the multilayer body 10. The pair of external electrodes 40 are provided at one end and the other end of the multilayer body 10 in the length direction L.

Figure 8:
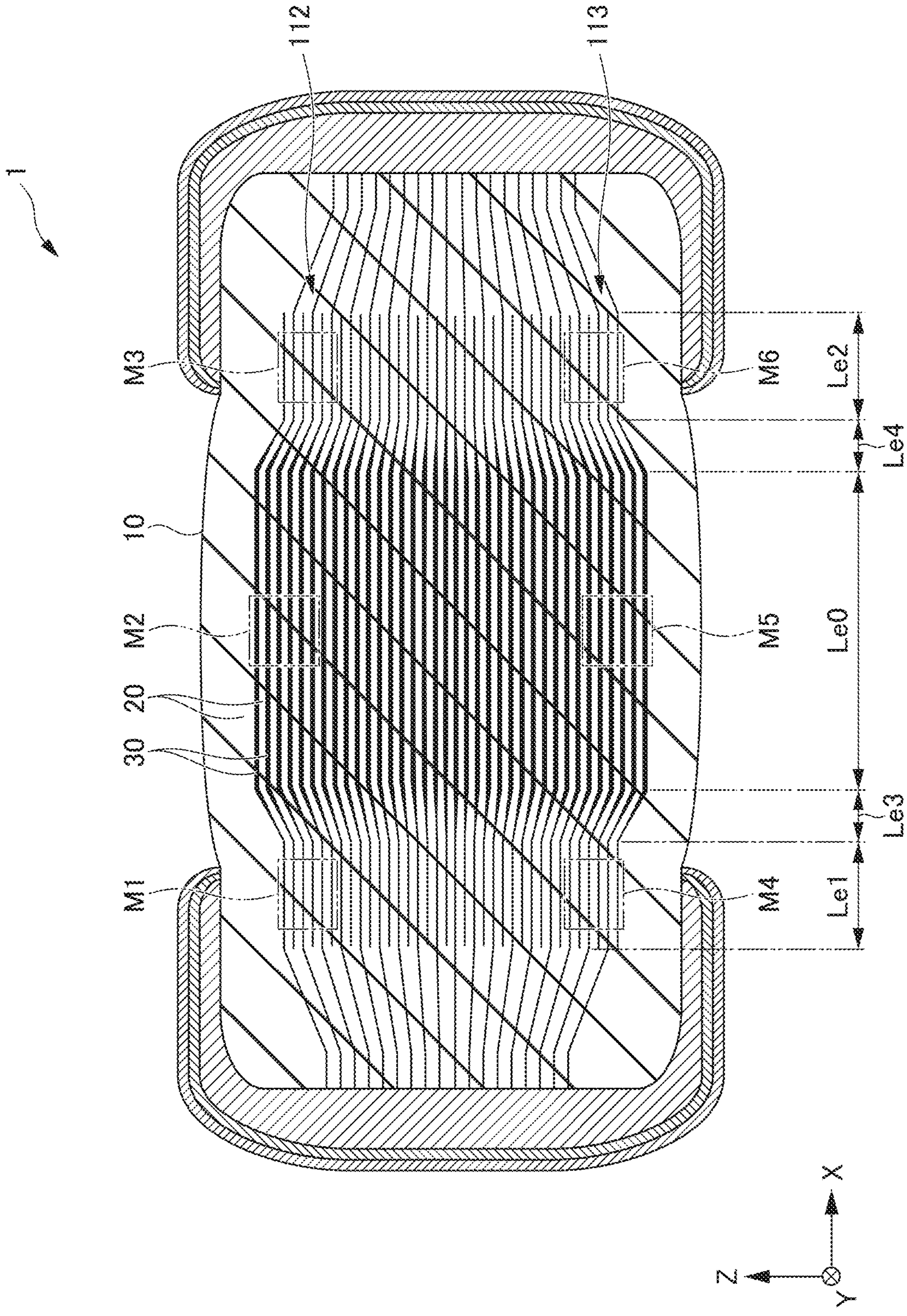
FIG. 8 is a diagram showing measurement points when measuring the thicknesses of an internal electrode layer and a dielectric layer.

In FIGS. 1 to 4B and FIGS. 5 and 8 described later, an XYZ orthogonal coordinate system is shown. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination direction T of the multilayer ceramic capacitor 1 and the multilayer body 10 corresponds to the Z direction. Here, the cross sections shown in FIGS. 2A, 2B, and 8 are also referred to as LT cross sections. The cross section shown in FIG. 3 is also referred to as a WT cross section. The cross sections shown in FIGS. 4A and 4B are also referred to as LW cross sections.

As shown in FIGS. 1 to 4B, the multilayer body 10 includes a first main surface TS1 and a second main surface TS2 which are opposed to each other in the lamination direction T, a first end surface LS1 and a second end surface LS2 which are opposed to each other in the length direction L orthogonal or substantially orthogonal to the lamination direction T, and a first lateral surface WS1 and a second lateral surface WS2 which are opposed to each other in the width direction W orthogonal or substantially orthogonal to the lamination direction T and the length direction L.

As shown in FIG. 1, the multilayer body 10 has a rectangular or substantially rectangular parallelepiped shape. The dimension in the length direction L of the multilayer body 10 may be longer than the dimension in the width direction W. The corner portions and ridge portions of the multilayer body 10 are preferably rounded. The corner portions are portions where the three surfaces of the multilayer body intersect, and the ridge portions are portions where the two surfaces of the multilayer body intersect. In addition, unevenness or the like may be provided on a portion or the entirety of the surface of the multilayer body 10.

The dimensions of the multilayer body 10 are not particularly limited. However, when the dimension in the length direction L of the multilayer body 10 is defined as L dimension, the L dimension is preferably about 0.2 mm or more and about 6 mm or less, for example. When the dimension of the multilayer body 10 in the lamination direction T is defined as T dimension, the T dimension is preferably about 0.05 mm or more and about 5 mm or less, for example. When the dimension of the multilayer body 10 in the width direction W is defined as W dimension, the dimension W is preferably about 0.1 mm or more and about 5 mm or less, for example.

As shown in FIGS. 2A, 2B, and 3, the multilayer body 10 includes an inner layer portion 11, and a first main surface-side outer layer portion 12 and a second main surface-side outer layer portion 13 that sandwich the inner layer portion 11 in the lamination direction T.

The inner layer portion 11 includes a plurality of dielectric layers 20 defining and functioning as a plurality of ceramic layers and a plurality of internal electrode layers 30 defining and functioning as a plurality of internal conductive layers which are alternately laminated in the lamination direction T. The inner layer portion 11 includes, in the lamination direction T, from the internal electrode layer 30 located closest to the first main surface TS1 to the internal electrode layer 30 located closest to the second main surface TS2. In the inner layer portion 11, a plurality of internal electrode layers 30 are opposed to each other with the dielectric layer 20 interposed therebetween. The inner layer portion 11 generates a capacitance and substantially defines and functions as a capacitor. In addition, the thickness of the inner layer portion 11 in the lamination direction T varies along the length direction L in accordance with the shape of the internal electrode layer 30 located closest to the first main surface TS1 and the shape of the internal electrode layer 30 located closest to the second main surface TS2.

The plurality of dielectric layers 20 are each made of a dielectric material. The dielectric material may be a dielectric ceramic including a component such as, for example, $BaTiO_3$, $CaTiO_3$, $SrTiO_3$, or $CaZrO_3$. Furthermore, the dielectric material may be obtained by adding a secondary component such as, for example, a Mn compound, an Fe compound, a Cr compound, a Co compound, or a Ni compound to the main component. The dielectric material particularly preferably includes $BaTiO_3$ as a main component.

The thicknesses of the dielectric layers 20 are each preferably about 0.2 μm or more and about 10 μm or less, for example. The number of the dielectric layers 20 to be laminated (stacked) is preferably fifteen or more and 1200 or less, for example. The number of the dielectric layers 20 refers to the total number of dielectric layers 20 in the inner layer portion 11, and dielectric layers 20 in the first main surface-side outer layer portion 12 and the second main surface-side outer layer portion 13.

The plurality of internal electrode layers 30 includes a plurality of first internal electrode layers 31 defining and functioning as a plurality of first internal conductive layers and a plurality of second internal electrode layers 32 defining and functioning as a plurality of second internal conductive layers. The first internal electrode layers 31 and the second internal electrode layers 32 are alternately provided in the lamination direction T with the dielectric layers 20 interposed therebetween. The first internal electrode layers 31 each extend toward the first end surface LS1 and are each exposed at the first end surface LS1. The second internal electrode layers 32 each extend toward the second end surface LS2 and are each exposed at the second end surface LS2. In the following description, when it is not necessary to distinguish between the first internal electrode layer 31 and the second internal electrode layer 32, the first internal electrode layer 31 and the second internal electrode layer 32 may be collectively referred to as an internal electrode layer 30.

As shown in FIGS. 2A and 4A, the first internal electrode layers 31 each include a first counter portion EA and a first extension portion D1. The first counter portion EA is a region opposed to the second internal electrode layer 32 with the dielectric layer 20 interposed therebetween, and is located inside the multilayer body 10. The first extension portion D1 is a portion which extends from the first counter portion EA toward the first end surface LS1, and is exposed at the first end surface LS1.

As shown in FIGS. 2A and 4B, the second internal electrode layers 32 each include a second counter portion EB and a second extension portion D2. The second counter portion EB is a region opposed to the first internal electrode layer 31 with the dielectric layer 20 interposed therebetween, and is located inside the multilayer body 10. The second extension portion D2 is a portion extending from the second counter portion EB toward the second end surface LS2, and is exposed at the second end surface LS2.

In the present example embodiment, the first counter portion EA and the second counter portion EB are opposed to each other with the dielectric layer 20 interposed therebetween, such that a capacitance is generated, and the characteristics of a capacitor are provided.

The shapes of the first counter portion EA and the second counter portion EB are not particularly limited, but are preferably rectangular or substantially rectangular. However, the corner portions of the rectangular shape may be rounded, or the corner portions of the rectangular shape may be provided obliquely. The shapes of the first extension portion D1 and the second extension portion D2 are not particularly limited, but are preferably rectangular or substantially rectangular. However, the corner portions of the rectangular shape may be rounded, or the corner portions of the rectangular shape may be provided obliquely.

The dimension of the first counter portion EA in the width direction W and the dimension of the first extension portion D1 in the width direction W may be the same, or either one of them may be smaller. The dimension of the second counter portion EB in the width direction W and the dimension of the second extension portion D2 in the width direction W may be the same, or either one of them may be narrower.

The first internal electrode layers 31 and the second internal electrode layers 32 are each made of an appropriate electrically conductive material including, for example, a metal such as Ni, Cu, Ag, Pd or Au, or an alloy including at least one of these metals. When using an alloy, the first internal electrode layers 31 and the second internal electrode layers 32 may be each made of, for example, an Ag—Pd alloy.

The thicknesses of the first internal electrode layers 31 and the second internal electrode layers 32 are each preferably, for example, about 0.2 μm or more and about 2.0 μm or less. The total number of the first internal electrode layers 31 and the second internal electrode layers 32 is preferably fifteen or more and 1000 or less.

As shown in FIGS. 2A, 2B, and 3, the first main surface-side outer layer portion 12 is located adjacent to the first main surface TS1 of the multilayer body 10. The first main surface-side outer layer portion 12 includes a plurality of dielectric layers 20 located between the first main surface TS1 and the internal electrode layer 30 closest to the first main surface TS1. On the other hand, the second main surface-side outer layer portion 13 is located adjacent to the second main surface TS2 of the multilayer body 10. The second main surface-side outer layer portion 13 includes a plurality of dielectric layers 20 located between the second main surface TS2 and the internal electrode layer 30 closest to the second main surface TS2. The dielectric layers 20 used in the first main surface-side outer layer portion 12 and the second main surface-side outer layer portion 13 may be the same as the dielectric layers 20 used in the inner layer portion 11.

The multilayer body 10 includes a counter electrode portion 11E. The counter electrode portion 11E is a portion where the first counter portions EA of the first internal electrode layer 31 and the second counter portions EB of the second internal electrode layer 32 are opposed to one another. The counter electrode portion 11E defines and functions as a portion of the inner layer portion 11. FIGS. 4A and 4B each show the range of the counter electrode portion 11E in the width direction W and the length direction L. The counter electrode portion 11E is also referred to as a capacitor active portion.

The multilayer body 10 includes lateral surface-side outer layer portions. The lateral surface-side outer layer portions include a first lateral surface-side outer layer portion WG1 and a second lateral surface-side outer layer portion WG2. The first lateral surface-side outer layer portion WG1 is a portion including the dielectric layer 20 located between the counter electrode portion 11E and the first lateral surface WS1. The second lateral surface-side outer layer portion WG2 is a portion including the dielectric layer 20 located between the counter electrode portion 11E and the second lateral surface WS2. FIG. 3, FIG. 4A, and FIG. 4B each show the ranges of the first lateral surface-side outer layer portion WG1 and the second lateral surface-side outer layer portion WG2 in the width direction W. The lateral surface-side outer layer portion is also referred to as a W gap or a side gap.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layers 20 and the first extension portions D1 located between the counter electrode portion 11E and the first end surface LS1. That is, the first end surface-side outer layer portion LG1 includes the portions of the plurality of dielectric layers 20 adjacent to the first end surface LS1 and the plurality of first extension portions D1. The second end surface-side outer layer portion LG2 is a portion including the dielectric layers 20 and the second extension portions D2 located between the counter electrode portion 11E and the second end surface LS2. That is, the second end surface-side outer layer portion LG2 includes the portions of the plurality of dielectric layers 20 adjacent to the second end surface LS2 and the plurality of second extension portions D2. FIGS. 2A, 2B, 4A, and 4B each show the ranges of the first end surface-side outer layer portion LG1 and the second end surface-side outer layer portion LG2 in the length direction L. The end surface-side outer layer portion is also referred to as an L gap or an end gap.

As shown in FIGS. 1, 2A, and 2B, the external electrodes 40 include a first external electrode 40A provided on the first end surface LS1 of the multilayer body 10 and a second external electrode 40B provided on the second end surface LS2 of the multilayer body 10.

In addition, the basic configurations of the first external electrode 40A and the second external electrode 40B are the same or substantially the same. Furthermore, the first external electrode 40A and the second external electrode 40B have a shape that is plane symmetrical or substantially plane symmetrical with respect to the WT cross section in the middle in the length direction L of the multilayer ceramic capacitor 1. Therefore, in the following description, when it is not necessary to distinguish between the first external electrode 40A and the second external electrode 40B, the first external electrode 40A and the second external electrode 40B may be collectively referred to as an external electrode 40.

The first external electrode 40A is provided on the first end surface LS1. The first external electrode 40A is in contact with the first extension portion D1 of each of the plurality of first internal electrode layers 31 exposed at the first end surface LS1. With such a configuration, the first external electrode 40A is electrically connected to the plurality of first internal electrode layers 31. The first external electrode 40A may be provided on a portion of the first main surface TS1 and a portion of the second main surface TS2, and also on a portion of the first lateral surface WS1 and a portion of the second lateral surface WS2. In the present example embodiment, the first external electrode 40A extends from the first end surface LS1 to a portion of the first main surface TS1 and to a portion of the second main surface TS2, and to a portion of the first lateral surface WS1 and to a portion of the second lateral surface WS2.

The second external electrode 40B is provided on the second end surface LS2. The second external electrode 40B is in contact with the second extension portion D2 of each of the plurality of second internal electrode layers 32 exposed at the second end surface LS2. With such a configuration, the second external electrode 40B is electrically connected to the plurality of second internal electrode layers 32. The second external electrodes 40B may be provided on a portion of the first main surface TS1 and a portion of the second main surface TS2, and also on a portion of the first lateral surface WS1 and a portion of the second lateral surface WS2. In the present example embodiment, the second external electrode 40B extends from the second end surface LS2 to a portion of the first main surface TS1 and to a portion of the second main surface TS2, and to a portion of the first lateral surface WS1 and a portion of the second lateral surface WS2.

As described above, in the multilayer body 10, the capacitance is generated by the first counter portions EA of the first internal electrode layers 31 and the second counter portions EB of the second internal electrode layers 32 which are opposed to each other with the dielectric layers 20 interposed therebetween. Therefore, characteristics of the capacitor are provided between the first external electrode 40A to which the first internal electrode layers 31 are connected and the second external electrode 40B to which the second internal electrode layers 32 are connected.

As shown in FIGS. 2A, 2B, 4A, and 4B, the first external electrode 40A includes a first base electrode layer 50A and a first plated layer 60A provided on the first base electrode layer 50A. Furthermore, the second external electrode 40B includes a second base electrode layer 50B and a second plated layer 60B provided on the second base electrode layer 50B.

The first base electrode layer 50A is provided on the first end surface LS1. The first base electrode layer 50A is connected to the first extension portion D1 of each of the plurality of first internal electrode layers 31 exposed at the first end surface LS1. In the present example embodiment, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is in contact with the second extension portion D2 of each of the plurality of second internal electrode layers 32 exposed at the second end surface LS2. In the present example embodiment, the second base electrode layer 50B extends from the second end surface LS2 to a portion of the first main surface TS1 and to a portion of the second main surface TS2, and to a portion of the first lateral surface WS1 and to a portion of the second lateral surface WS2.

The first base electrode layer 50A and the second base electrode layer 50B include at least one of, for example, a fired layer, a thin film layer, and the like.

The first base electrode layer 50A and the second base electrode layer 50B of the present example embodiment are fired layers. It is preferable that the fired layers each include both a metal component, and either a glass component or a ceramic component, or both the glass component and the ceramic component. The metal component includes, for example, at least one selected from Cu, Ni, Ag, Pd, Ag—Pd alloys, Au, and the like. The glass component includes, for example, at least one selected from B, Si, Ba, Mg, Al, Li, and the like. As the ceramic component, the same or substantially same ceramic material as that of the dielectric layer 20 may be used, or a different ceramic material may be used. Ceramic components include, for example, at least one selected from $BaTiO_3$, $CaTiO_3$, (Ba, Ca) $TiO_3$, $SrTiO_3$, $CaZrO_3$, and the like.

The fired layer is obtained by, for example, applying an electrically conductive paste including glass and metal to the multilayer body 10 and firing it. The fired layer can be obtained by simultaneously firing (cofiring) a multilayer chip before firing, which is a material of the multilayer body 10 having a plurality of internal electrodes and dielectric layers, and an electrically conductive paste applied to the multilayer chip. Alternatively, the multilayer chip may be fired to obtain the multilayer body 10, following which an electrically conductive paste may be applied to the multilayer body 10 and the resulting product may be fired. In a case of the above-described configuration, it is preferable that the fired layer is formed by firing a ceramic material added instead of the glass component. In such a case, it is particularly preferable to use, as the ceramic material to be added, the same or substantially same kind of ceramic material as the dielectric layer 20. The fired layer may include a plurality of layers.

The thickness of the first base electrode layer 50A located on the first end surface LS1 in the length direction L is preferably, for example, about 3 μm or more and about 200 μm or less in the middle of the first base electrode layer 50A in the lamination direction T and the width direction W.

The thickness of the second base electrode layer 50B located on the second end surface LS2 in the length direction L is preferably, for example, about 3 μm or more and about 200 μm or less in the middle of the second base electrode layer 50B in the lamination direction T and the width direction W.

When providing the first base electrode layer 50A to a portion of at least one surface of the first main surface TS1 and the second main surface TS2, the thickness in the lamination direction T of the first base electrode layer 50A provided at this portion is preferably about 3 μm or more and about 25 μm or less in the middle in the length direction L and the width direction W of the first base electrode layer 50A provided at this portion, for example.

When providing the first base electrode layer 50A to a portion of at least one surface of the first lateral surface WS1 and the second lateral surface WS2, the thickness in the width direction W of the first base electrode layer 50A provided at this portion is preferably about 3 μm or more and about 25 μm or less in the middle in the length direction L and the height direction T of the first base electrode layer 50A provided at this portion, for example.

When providing the second base electrode layer 50B to a portion of at least one surface of the first main surface TS1 and the second main surface TS2, the thickness in the lamination direction T of the second base electrode layer 50B provided at this portion is preferably about 3 μm or more and about 25 μm or less in the middle in the length direction L and the width direction W of the second base electrode layer 50B provided at this portion, for example.

When providing the second base electrode layer 50B to a portion of at least one surface of the first lateral surface WS1 and the second lateral surface WS2, the thickness in the width direction W of the second base electrode layer 50B provided at this portion is preferably about 3 μm or more and about 25 μm or less in the middle in the length direction L and the height direction T of the second base electrode layer 50B provided at this portion, for example.

In the present example embodiment, each of the first base electrode layer 50A and the second base electrode layer 50B may be thin film layers. The thin film layer is a layer on which metal particles are deposited.

When the first base electrode layer 50A and the second base electrode layer 50B are thin film layers, they are preferably formed by, for example, a thin film forming method such as a sputtering method or a vapor deposition method. Here, a sputtered electrode formed by a sputtering method is described.

The first base electrode layer 50A of the present example embodiment includes a first thin film layer formed by a sputtered electrode. The second base electrode layer 50B includes a second thin film layer formed by a sputtered electrode. When the base electrode layer is formed by the sputtered electrode, the sputtered electrode is preferably formed directly on at least one of the first main surface TS1 and the second main surface TS2 of the multilayer body 10. In the present example embodiment, the first thin film layer of the sputtered electrode is provided on a portion of the first main surface TS1 adjacent to the first lateral surface WS1. The second thin film layer of the sputtered electrode is provided on a portion of the first main surface TS1 adjacent to the second lateral surface WS2.

The thin film layer formed by the sputtered electrode preferably includes, for example, at least one of Mg, Al, Ti, W, Cr, Cu, Ni, Ag, Co, Mo, and V. With such a configuration, it is possible to increase the fixing force of the external electrode 40 to the multilayer body 10. The thin film layer may include a single layer or a plurality of layers. For example, the thin film layer may include a two-layer structure of a Ni—Cr alloy layer and a Ni—Cu alloy layer.

The first plated layer 60A covers the first base electrode layer 50A.

The second plated layer 60B covers the second base electrode layer 50B.

The first plated layer 60A and the second plated layer 60B may each include at least one of Cu, Ni, Sn, Ag, Pd, a Ag—Pd alloy, Au, and the like, for example. The first plated layer 60A and the second plated layer 60B may each include a plurality of layers. The first plated layer 60A and the second plated layer 60B each preferably include a two-layer structure including, for example, a Sn plated layer on a Ni plated layer.

In the present example embodiment, the first plated layer 60A includes a first Ni plated layer 61A, and a first Sn plated layer 62A provided on the first Ni plated layer 61A.

In the present example embodiment, the second plated layer 60B includes a second Ni plated layer 61B, and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1. The thickness of each of the first Ni plated layer 61A, the first Sn plated layer 62A, the second Ni plated layer 61B, and the second Sn plated layer 62B is, for example, preferably about 2 μm or more and about 10 μm or less.

The external electrode 40 of the present example embodiment may include an electrically conductive resin layer including electrically conductive particles and a thermosetting resin, for example. The electrically conductive resin layer may cover the fired layer. When the electrically conductive resin layer covers the fired layer, the electrically conductive resin layer is provided between the fired layer and the plated layers (the first plated layer 60A and the second plated layer 60B). The electrically conductive resin layer may completely cover the fired layer or may partially cover the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle is applied to the multilayer ceramic capacitor 1, the electrically conductive resin layer defines and functions as a buffer layer. Therefore, the electrically conductive resin layer reduces or prevents the occurrence of cracking in the multilayer ceramic capacitor 1.

Metals of the electrically conductive particles may be, for example, Ag, Cu, Ni, Sn, Bi or alloys including them. The electrically conductive particle preferably includes Ag, for example. The electrically conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the electrically conductive particle.

Furthermore, the electrically conductive particle may be a metal powder coated on the surface of the metal powder with Ag. When using those coated with Ag on the surface of the metal powder, the metal powder is, for example, preferably Cu, Ni, Sn, Bi, or an alloy powder thereof. In order to make the metal of the base material inexpensive while keeping the characteristics of Ag, it is preferable to use a metal powder coated with Ag.

Furthermore, for example, the electrically conductive particle may be formed by subjecting Cu and Ni to an oxidation prevention treatment. Furthermore, for example, the electrically conductive particle may be a metal powder coated with Sn, Ni, and Cu on the surface of the metal powder. When using those coated with Sn, Ni, and Cu on the surface of the metal powder, the metal powder is, for example, preferably Ag, Cu, Ni, Sn, Bi, or an alloy powder thereof.

The shape of the electrically conductive particle is not particularly limited. For the electrically conductive particle, a spherical metal powder, a flat metal powder, or the like can be used. However, it is preferable to use a mixture of a spherical metal powder and a flat metal powder.

The electrically conductive particles included in the electrically conductive resin layer mainly play a role of maintaining the electrical conductivity of the electrically conductive resin layer. Specifically, by a plurality of electrically conductive particles being in contact with each other, an energization path is provided inside the electrically conductive resin layer.

The resin of the electrically conductive resin layer may include, for example, at least one selected from a variety of known thermosetting resins such as epoxy resin, phenolic resin, urethane resin, silicone resin, polyimide resin, and the like. Among those, epoxy resin is excellent in heat resistance, moisture resistance, adhesion, etc., and thus is one of the more preferable resins. Furthermore, it is preferable that the resin of the electrically conductive resin layer include a curing agent together with a thermosetting resin. When epoxy resin is used as a base resin, the curing agent for the epoxy resin may be various known compounds such as phenols, amines, acid anhydrides, imidazoles, active esters, and amide-imides, for example.

The electrically conductive resin layer may include a plurality of layers. The thickest portion of the electrically conductive resin layer is, for example, preferably about 10 μm or more and about 150 μm or less.

In addition, the first base electrode layer 50A and the second base electrode layer 50B may not be provided, and a first plated layer 60A and a second plated layer 60B described later may be directly provided on the multilayer body 10. That is, the multilayer ceramic capacitor 1 may include a plated layer that is directly electrically connected to the first internal electrode layers 31 and the second internal electrode layers 32. In such a case, a plated layer may be provided after the catalyst is provided on the surface of the multilayer body 10 as a pretreatment.

In this case as well, the plated layer preferably includes a plurality of layers. Each of the lower plated layer and the upper plated layer preferably includes, for example, at least one of Cu, Ni, Sn, Pb, Au, Ag, Pd, Bi, and Zn, or an alloy including these metals. The lower plated layer is more preferably formed using Ni having solder barrier performance. The upper plated layer is more preferably formed using Sn or Au having good solder wettability. For example, when the first internal electrode layers 31 and the second internal electrode layers 32 are formed using Ni, the lower plated layer is preferably formed using Cu having good bonding property with Ni. The upper plated layer may be formed as necessary, and the external electrode 40 may be formed of only the lower plated layer. The upper plated layer may be the outermost layer, or another plated layer may be further provided on the surface of the upper plated layer.

The thickness per layer of the plated layer provided without the base electrode layer is, for example, preferably about 2 μm or more and about 10 μm or less. The plated layer preferably does not include glass. The metal ratio per unit volume of the plated layer is, for example, preferably about 99% by volume or more.

When the plated layer is directly provided on the multilayer body 10, it is possible to reduce the thickness of the base electrode layer. Therefore, since the thickness of the base electrode layer is reduced, it is possible to reduce the dimension of the multilayer ceramic capacitor 1 in the height direction T, such that it is possible to reduce the height of the multilayer ceramic capacitor 1. Alternatively, it is possible to increase the thickness of the dielectric layer 20 sandwiched between the first internal electrode layer 31 and the second internal electrode layer 32 by an amount corresponding to the reduction in the thickness of the base electrode layer, such that it is possible to improve the thickness of the element body. As described above, by directly forming the plated layer on the multilayer body 10, it is possible to improve the degree of freedom in designing the multilayer ceramic capacitor.

The basic configuration of the multilayer ceramic capacitor 1 according to the present example embodiment is described above. When the dimension in the length direction of the multilayer ceramic capacitor 1 including the multilayer body 10 and the external electrode 40 is defined as an L dimension, the L dimension is, for example, preferably about 0.2 mm or more and about 6 mm or less. When the dimension in the lamination direction of the multilayer ceramic capacitor 1 is defined as a T direction, the T dimension is, for example, preferably about 0.05 mm or more and about 5 mm or less. When the dimension in the width direction of the multilayer ceramic capacitor 1 is defined as a W direction, the W dimension is, for example, preferably about 0.1 mm or more and about 5 mm or less.

Here, the inventor of example embodiments of the present invention has discovered from rigorous studies, experiments, and simulations that, in order to increase the capacitance without increasing the size of the multilayer ceramic capacitor, it is preferable to appropriately set the dimensions and coverage of each configuration included in the multilayer ceramic capacitor. In addition to the metal material, the internal electrode layer 30 includes hollow portions where the metal material does not exist, and the ratio of the metal material in the internal electrode layer 30 will be described as coverage. The coverage is also referred to as a coverage ratio of the internal electrode layer 30 with respect to the dielectric layer 20. A ceramic component such as a dielectric or a glass component such as silica may be present in the hollow portions where the metal material does not exist. Alternatively, the hollow portions may be voids. Hereinafter, the present example embodiment will be described in detail with reference to FIGS. 1 to 7.

As shown in FIGS. 2A to 3, the inner layer portion 11 includes a first main surface-side inner layer portion 112, a second main surface-side inner layer portion 113, and a middle inner layer portion 111 provided between the first main surface-side inner layer portion 112 and the second main surface-side inner layer portion 113.

The first main surface-side inner layer portion 112 is a portion of the inner layer portion 11 adjacent to the first main surface TS1. The first main surface-side inner layer portion 112 is, for example, a portion of the inner layer portion 11 adjacent to the first main surface TS1, and includes at least the internal electrode layers 30 from the internal electrode layer 30 closest to the first main surface TS1 to the fifth internal electrode layer 30. The first main surface-side inner layer portion 112 is, for example, a portion occupying about 25% of the inner layer portion 11 adjacent to the first main surface TS1 in the lamination direction.

The second main surface-side inner layer portion 113 is a portion of the inner layer portion 11 adjacent to the second main surface TS2. The second main surface-side inner layer portion 113 is, for example, a portion of the inner layer portion 11 adjacent to the second main surface TS2, and includes at least the internal electrode layers 30 from the internal electrode layer 30 closest to the second main surface TS2 to the fifth internal electrode layer 30. The second main surface-side inner layer portion 113 is, for example, a portion occupying about 25% of the inner layer portion 11 adjacent to the second main surface TS2 in the lamination direction.

The middle inner layer portion 111 is a portion of the inner layer portion 11 in the middle in the lamination direction T of the multilayer body 10. The middle inner layer portion 111 is, for example, a portion including at least the internal electrode layers 30 provided in the middle region of the multilayer body in the lamination direction T. The thicknesses of the middle inner layer portion 111, the first main surface-side inner layer portion 112, and the second main surface-side inner layer portion 113 in the lamination direction T change along the length direction L in accordance with the shape of the internal electrode layers 30.

As shown in FIGS. 3 to 4B, the counter electrode portion 11E of the inner layer portion 11 includes a first lateral surface-side counter electrode portion 112E, a second lateral surface-side counter electrode portion 113E, and a middle counter electrode portion 111E.

The first lateral surface-side counter electrode portion 112E is a portion of the counter electrode portion 11E adjacent to the first lateral surface WS1. The first lateral surface-side counter electrode portion 112E is, for example, a portion occupying 25% of the counter electrode portion 11E adjacent to the first lateral surface WS1 in the width direction W. The first lateral surface-side counter electrode portion 112E includes a region overlapping a portion of each of the first main surface-side inner layer portion 112, the second main surface-side inner layer portion 113, and the middle inner layer portion 111.

The second lateral surface-side counter electrode portion 113E is a portion of the counter electrode portion 11E adjacent to the second lateral surface WS2. The second lateral surface-side counter electrode portion 113E is, for example, a portion occupying about 25% of the counter electrode portion 11E adjacent to the second lateral surface WS2 in the width direction W. The second lateral surface-side counter electrode portion 113E includes a region overlapping a portion of each of the first main surface-side inner layer portion 112, the second main surface-side inner layer portion 113, and the middle inner layer portion 111.

The middle counter electrode portion 111E is provided between the first lateral surface-side counter electrode portion 112E and the second lateral surface-side counter electrode portion 113E. The middle counter electrode portion 111E is a portion including a middle region in the width direction W of the counter electrode portion 11E in the width direction W. The middle counter electrode portion 111E includes a region overlapping a portion of each of the first main surface-side inner layer portion 112, the second main surface-side inner layer portion 113, and a portion of the middle inner layer portion 111.

Next, details of the internal electrode layers 30 will be described with reference to FIGS. 2B, 4A, and 4B.

The first counter portion EA includes a first region EA1, a second region EA2, and a first middle region EA0. The first region EA1 is provided adjacent to the first end surface LS1. The second region EA2 is provided adjacent to the second end surface LS2. The first middle region EA0 is located between the first region EA1 and the second region EA2. The first middle region EA0 has higher coverage than the first region EA1 and the second region EA2, for example. In addition, as shown in FIG. 2B, the first middle region EA0 is disposed more toward the outside of the multilayer body 10 than the first region EA1 and the second region EA2.

Specifically, in the first main surface-side inner layer portion 112, the first middle region EA0 of each of the first internal electrode layers 31 is disposed more toward the first main surface TS1 of the multilayer body 10 than the first region EA1 and the second region EA2. Further, in the present example embodiment, in the second main surface-side inner layer portion 113, the first middle region EA0 of each of the first internal electrode layers 31 is disposed more toward the second main surface TS2 of the multilayer body 10 than the first region EA1 and the second region EA2. In at least one of the first main surface-side inner layer portion 112 or the second main surface-side inner layer portion 113, the first middle region EA0 may be disposed more toward the outside of the multilayer body 10 than the first region EA1 and the second region EA2.

The second counter portion EB includes a third region EB1, a fourth region EB2, and a second middle region EB0. The third region EB1 is provided adjacent to the second end surface LS2. The fourth region EB2 is provided adjacent to the first end surface LS1. The second middle region EB0 is located between the third region EB1 and the fourth region EB2. The second middle region EB0 has higher coverage than the third region EB1 and the fourth region EB2. In addition, as shown in FIG. 2B, the second middle region EB0 is disposed more toward the outside of the multilayer body 10 than the third region EB1 and the fourth region EB2.

Specifically, in the first main surface-side inner layer portion 112, the second middle region EB0 of each of the second internal electrode layers 32 is disposed more toward the first main surface TS1 of the multilayer body 10 than the third region EB1 and the fourth region EB2. In addition, in the present example embodiment, in the second main surface-side inner layer portion 113, the second middle region EB0 of each of the second internal electrode layers 32 is disposed more toward the second main surface TS2 of the multilayer body 10 than the third region EB1 and the fourth region EB2. In at least one of the first main surface-side inner layer portion 112 or the second main surface-side inner layer portion 113, the second middle region EB0 may be disposed more toward the outside of the multilayer body 10 than the third region EB1 and the fourth region EB2.

With such a configuration, it is possible to increase the thickness of each of the internal electrode layers 30 in the first middle region EA0 and the second middle region EB0, thereby increasing the coverage and increasing the capacitance, while reducing or preventing an increase in size of the multilayer ceramic capacitor 1.

The first middle region EA0 is preferably parallel or substantially parallel to a plane orthogonal or substantially orthogonal to the lamination direction T. Each of the first middle region EA0, the first region EA1, and the second region EA2 preferably includes a portion parallel or substantially parallel to one another. More preferably, each of the first middle region EA0, the first region EA1, and the second region EA2 includes a portion parallel or substantially parallel to a plane orthogonal or substantially orthogonal to the lamination direction T.

The second middle region EB0 is preferably parallel or substantially parallel to a plane orthogonal or substantially orthogonal to the lamination direction T. Each of the second middle region EB0, the third region EB1, and the fourth region EB2 preferably includes a portion parallel or substantially parallel to one another. More preferably, each of the second middle region EB0, the third region EB1, and the fourth region EB2 includes a portion parallel or substantially parallel to a plane orthogonal or substantially orthogonal to the lamination direction T.

With such a configuration, it is possible to reduce or prevent the formation of a portion having a locally large size in the multilayer ceramic capacitor 1, and it is possible to increase the capacitance without increasing the size of the multilayer ceramic capacitor 1.

In the length direction L, the distance Le0 of the first middle region EA0 is shorter than the distance L1 between the first external electrode 40A and the second external electrode 40B. In addition, in the length direction L, the distance Le0 of the second middle region EB0 is shorter than the distance L1 between the first external electrode 40A and the second external electrode 40B. In the length direction L, the distance of the first middle region EA0 and the distance of the second middle region EB0 are preferably substantially equal to each other, but are not limited thereto. In the length direction L, the first middle region EA0 and the second middle region EB0 are preferably provided within the range of the distance L1 between the first external electrode 40A and the second external electrode 40B.

In the length direction L, the end portion of each of the first middle region EA0 and the second middle region EB0 adjacent to the first end surface LS1 is provided closer to the second end surface LS2 than the end portion 40AE of the first external electrode 40A provided on the first main surface TS1 and the second main surface TS2 adjacent to the middle of the multilayer body. In the length direction L, the end portion of each of the first middle region EA0 and the second middle region EB0 adjacent to the second end surface LS2 is provided closer to the first end surface LS1 than the end portions 40BE of the second external electrode 40B provided on the first main surface TS1 and the second main surface TS2 adjacent to the middle of the multilayer body.

With such a configuration, it is possible to increase the thickness of each of the internal electrode layers 30 in the first middle region EA0 and the second middle region EB0, thus increasing the coverage and increasing the capacitance, while reducing or preventing an increase in size of the multilayer ceramic capacitor 1.

In the length direction L, the end portions (left ends of the EA and EB regions in FIG. 2B) of the first region EA1 and the fourth region EB2 adjacent to the first end surface LS1 are provided closer to the first end surface LS1 than the end portions 40AE of the first external electrode 40A provided on the first main surface TS1 and the second main surface TS2 adjacent to the middle of the multilayer body. In the length direction L, the end portions (right ends of the EA and EB regions in FIG. 2B) of the second region EA2 and the third region EB1 adjacent to the second end surface LS2 are provided closer to the second end surface LS2 than the end portions 40BE of the second external electrode 40B provided on the first main surface TS1 and the second main surface TS2 adjacent to the middle of the multilayer body.

With such a configuration, it is possible to maintain a large area of the counter electrode portion 11E and to increase the capacitance, while reducing or preventing an increase in size of the multilayer ceramic capacitor 1.

The thickness of the first middle region EA0 in the lamination direction T of each of the first internal electrode layers 31 is thicker than the thickness of the first region EA1 or the second region EA2 in the lamination direction T of each of the first internal electrode layers 31.

For example, the thickness of the first middle region EA0 of each of the internal electrode layers is preferably about 101.6% or more and about 111.3% or less of the thickness of the first region EA1 or the second region EA2 of each of the internal electrode layers. The thickness of the first middle region EA0 of each of the internal electrode layers may be, for example, about 101.6% or more and about 109.8% or less, and more preferably about 102.0% or more and about 109.8% or less of the thickness of the first region EA1 or the thickness of the second region EA2 of each of the internal electrode layers. For example, the thickness of the first middle region EA0 of each of the internal electrode layers is more preferably about 103.0% or more and about 109.8% or less of the thickness of the first region EA1 or the thickness of the second region EA2 of each of the internal electrode layers.

The thickness of the second middle region EB0 of each of the second internal electrode layers 32 in the lamination direction T is thicker than the thickness of the third region EB1 or the thickness of the fourth region EB2 of each of the second internal electrode layer 32.

For example, the thickness of the second middle region EB0 of each of the internal electrode layers is preferably about 101.6% or more and about 111.3% or less of the thickness of the third region EB1 or the fourth region EB2 of each of the internal electrode layers. The thickness of the second middle region EB0 of each of the internal electrode layers may be, for example, about 101.6% or more and about 109.8% or less, and more preferably about 102.0% or more and about 109.8% or less of the thickness of the third region EB1 or the fourth region EB2 of each of the internal electrode layers. For example, the thickness of the second middle region EB0 of each of the internal electrode layers is more preferably about 103.0% or more and about 109.8% or less of the thickness of the third region EB1 or the fourth region EB2 of each of the internal electrode layers.

When the first internal electrode layer 31 and the second internal electrode layer 32 are collectively described, the thickness of each of the first middle region EA0 and the second middle region EB0 of the internal electrode layers is thicker than the thickness of each of the first region EA1, the second region EA2, the third region EB1, and the fourth region EB2. The thickness of each of the first middle region EA0 and the second middle region EB0 of the internal electrode layers is, for example, preferably about 101.6% or more and about 111.3% or less of the thickness of each of the first region EA1, the second region EA2, the third region EB1, and the fourth region EB2. The thickness of each of the first middle region EA0 and the second middle region EB0 of the internal electrode layers may be, for example, about 101.6% or more and about 109.8% or less, and more preferably about 102.0% or more and about 109.8% or less of the thickness of each of the first region EA1, the second region EA2, the third region EB1, and the fourth region EB2. For example, it is more preferable that the thickness of each of the first middle region EA0 and the second middle region EB0 of each of the internal electrode layers are about 103.0% or more and about 109.8% or less of the thickness of each of the first region EA1, the second region EA2, the third region EB1, and the fourth region EB2.

The first middle region EA0 of each of the first internal electrode layers 31 is thicker in the lamination direction T than each of the first extension portions D1.

For example, the thickness of the first middle region EA0 is preferably about 101.6% or more and about 111.3% or less of the first extension portion D1. For example, the thickness of the first middle region EA0 of each of the internal electrode layers may be about 101.6% or more and about 109.8% or less, and more preferably about 102.0% or more and about 109.8% or less of the thickness of each of the first extension portions D1. For example, the thickness of the first middle region EA0 is more preferably about 103.0% or more and about 109.8% or less of the thickness of the first extension portion D1.

The thickness of the second middle region EB0 in the lamination direction T of each of the second internal electrode layers 32 is thicker than each of the second extension portions D2.

For example, the thickness of the second middle region EB0 of each of the internal electrode layers is preferably about 101.6% or more and about 111.3% or less of the thickness of each of the second extension portions D2. For example, the thickness of the second middle region EB0 of each of the internal electrode layers may be about 101.6% or more and about 109.8% or less, and more preferably about 102.0% or more and about 109.8% or less of the thickness of each of the second extension portions D2. For example, the thickness of the second middle region EB0 of each of the internal electrode layers is more preferably about 103.0% or more and about 109.8% or less of the thickness of each of the second extension portions D2.

The coverage of the first middle region EA0 is higher than the coverage of the first region EA1 and the coverage of the second region EA2.

The difference between the coverage of the first middle region EA0, and the coverage of the first region EA1 and the coverage of the second region EA2 is, for example, preferably about 2.2 percentage points or more. The difference between the coverage of the first middle region EA0, and the coverage of the first region EA1 and the coverage of the second region EA2 is, for example, preferably about 2.2 percentage points or more and about 11.4 percentage points or less.

The difference between the coverage of the first middle region EA0, and the coverage of the first region EA1 and the coverage of the second region EA2 is, for example, more preferably about 3.0 percentage points or more and about 11.4 percentage points or less, and a higher advantageous effect is expected. Further, the difference between the coverage of the first middle region EA0, and the coverage of the first region EA1 and the coverage of the second region EA2 is, for example, more preferably about 4.0 percentage points or more and about 11.4 percentage points or less.

The second middle region EB0 has a higher coverage than the coverage of the third region EB1 and the coverage of the fourth region EB2.

The difference between the coverage of the second middle region EB0, and the coverage of the third region EB1 and the coverage of the fourth region EB2 is, for example, preferably about 2.2 percentage points or more. The difference between the coverage of the second middle region EB0, and the coverage of the third region EB1 and the coverage of the fourth region EB2 is, for example, preferably about 2.2 percentage points or more and about 11.4 percentage points or less.

The difference between the coverage of the second middle region EB0, and the coverage of the third region EB1 and the coverage of the fourth region EB2 is, for example, more preferably about 3.0 percentage points or more and about 11.4 percentage points or less, and a higher advantageous effect is expected. Further, the difference between the coverage of the second middle region EB0, and the coverage of the third region EB1 and the coverage of the fourth region EB2 is, for example, more preferably about 4.0 percentage points or more and about 11.4 percentage points or less.

When the first internal electrode layer 31 and the second internal electrode layer 32 are collectively described, the coverages of the first middle region EA0 and the second middle region EB0 are higher than the coverages of the first region EA1, the second region EA2, the third region EB1, and the fourth region EB2. The coverages of the first middle region EA0 and the second middle region EB0 are, for example, preferably higher than the coverages of the first region EA1, the second region EA2, the third region EB1, and the fourth region EB2 by about 2.2 percentage points or more. The difference between the coverages of the first middle region EA0 and the second middle region EB0 and the coverages of the first region EA1, the second region EA2, the third region EB1, and the fourth region EB2 is, for example, preferably about 2.2 percentage points or more and about 11.4 percentage points or less. The difference between the coverages of the first middle region EA0 and the second middle region EB0 and the coverages of the first region EA1, the second region EA2, the third region EB1, and the fourth region EB2 is, for example, more preferably about 3.0 percentage points or more and about 11.4 percentage points or less, and a higher advantageous effect is expected. Further, the difference between the coverages of the first middle region EA0 and the second middle region EB0 and the coverages of the first region EA1, the second region EA2, the third region EB1, and the fourth region EB2 is, for example, more preferably about 4.0 percentage points or more and about 11.4 percentage points or less.

With such a configuration, it is possible to increase the thickness of each of the internal electrode layers 30 in the first middle region EA0 and the second middle region EB0, thus sufficiently increasing the coverage, such that it is possible to further increase the capacitance without increasing the size of the multilayer ceramic capacitor 1.

As shown in FIG. 2B, each of the first internal electrode layers 31 further includes a first sloped portion FA1 that couples the first region EA1 and the first middle region EA0, and a second sloped portion FA2 that couples the second region EA2 and the first middle region EA0.

Each of the second internal electrode layers 32 further includes a third sloped portion FB1 that couples the third region EB1 and the second middle region EB0, and a fourth sloped portion FB2 that couples the fourth region EB2 and the second middle region EB0.

With such a configuration, it is possible to increase the thickness of each of the internal electrode layers 30 in the first middle region EA0 and the second middle region EB0, thus increasing the coverage and increasing the capacitance, while reducing or preventing an increase in size of the multilayer ceramic capacitor 1.

The distance Le3 in the length direction L of the first sloped portion FA1 and the distance Le4 in the length direction L of the second sloped portion FA2 are shorter than the distance Le0 in the length direction L of the first middle region EA0. Further, the distance Le4 in the length direction L of the third sloped portion FB1 and the distance Le3 in the length direction L of the fourth sloped portion FB2 are shorter than the distance Le0 in the length direction L of the second middle region EB0.

With such a configuration, since it is possible to maintain the areas of the first middle region EA0 and the second middle region EB0 having high coverage, it is possible to further increase the capacitance without increasing the size of the multilayer ceramic capacitor 1.

Further, the distance Le1 in the length direction L of the first region EA1 and the distance Le2 in the length direction L of the second region EA2 may be shorter than the distance Le0 in the length direction L of the first middle region EA0. Further, the distance Le2 in the length direction L of the third region EB1 and the distance Le1 in the length direction L of the fourth region EB2 may be shorter than the distance Le0 in the length direction L of the second middle region EB0.

The ratio of the area of the first middle region EA0 to the area of the first counter portion EA is, for example, preferably about 50% or more and about 90% or less, and may be about 60% or more and about 85% or less. More preferably, for example, it is about 70% or more and about 80% or less, for example, about 75%. The ratio of the area of the second middle region EB0 to the area of the second counter portion EB is, for example, preferably about 50% or more and about 90% or less, and may be about 60% or more and about 85% or less. More preferably, for example, it is about 70% or more and about 80% or less, for example, 75%.

With such a configuration, it is possible to maintain a large area of the counter electrode portion 11E, to maintain an area in which the first external electrode 40A and the second external electrode 40B are provided, and to appropriately maintain the areas of the first middle region EA0 and the second middle region EB0 having high coverage. Therefore, it is possible to further increase the capacitance without increasing the size of the multilayer ceramic capacitor 1.

The distance Le3 in the length direction L of the first sloped portion FA1 and the fourth sloped portion FB2 and the distance Le4 in the length direction L of the second sloped portion FA2 and the third sloped portion FB1 are preferably substantially equal to each other, but are not limited thereto. In the length direction L, it is preferable that the first middle region EA0 and the second middle region EB0 are provided within the range of the distance L1 between the first external electrode 40A and the second external electrode 40B, and the first sloped portion FA1, the second sloped portion FA2, the third sloped portion FB1, and the fourth sloped portion FB2 are also provided within the range of the distance L1 between the first external electrode 40A and the second external electrode 40B. The distance obtained by adding the distance Le0 in the length direction L of the first middle region EA0 and the second middle region EB0, the distance Le3 in the length direction L of the first sloped portion FA1 and the fourth sloped portion FB2, and the distance Le4 in the length direction L of the second sloped portion FA2 and the third sloped portion FB1 (Le0+Le3+Le4) is preferably shorter than the distance L1 between the first external electrode 40A and the second external electrode 40B. However, the present invention is not limited to this configuration.

The slope angle θ of the first sloped portion FA1 with respect to the first middle region EA0 is, for example, preferably about 1° or more. For example, the slope angle θ of the first sloped portion FA1 with respect to the first middle region EA0 may be about 1° or more and about 12° or less. More preferably, the slope angle θ of the first sloped portion FA1 with respect to the first middle region EA0 may be about 2° or more and about 10° or less, for example.

The slope angle θ of the second sloped portion FA2 with respect to the first middle region EA0 is, for example, preferably about 1° or more. For example, the slope angle θ of the second sloped portion FA2 with respect to the first middle region EA0 may be about 1° or more and about 120 or less. More preferably, the slope angle θ of the second sloped portion FA2 with respect to the first middle region EA0 may be about 2° or more and about 10° or less, for example.

The slope angle θ of the third sloped portion FB1 with respect to the second middle region EB0 is, for example, preferably about 1° or more. For example, the slope angle θ of the third sloped portion FB1 with respect to the second middle region EB0 may be about 1° or more and about 12° or less. More preferably, for example, the slope angle θ of the third sloped portion FB1 with respect to the second middle region EB0 may be about 2° or more and about 10° or less.

The slope angle θ of the fourth sloped portion FB2 with respect to the second middle region EB0 is, for example, preferably about 1° or more. For example, the slope angle θ of the fourth sloped portion FB2 with respect to the second middle region EB0 may be about 1° or more and about 120 or less. More preferably, for example, the slope angle θ of the fourth sloped portion FB2 with respect to the second middle region EB0 may be about 2° or more and about 0° or less.

In FIG. 2B, the slope angle θ of the third sloped portion FB1 with respect to the second middle region EB0 in the second internal electrode layer 32 is shown as an example of the above-described slope angle θ.

With such a configuration, it is possible to increase the thickness of each of the internal electrode layers 30 in the first middle region EA0 and the second middle region EB0, thus increasing the coverage and increasing the capacitance, while reducing or preventing an increase in size of the multilayer ceramic capacitor 1. Specifically, by setting the slope angle θ to about 1° or more, preferably about 2° or more, it is possible to maintain a region for increasing the thickness of each of the internal electrode layers 30 in the first middle region EA0 and the second middle region EB0. Further, by setting the above-described slope angle θ to about 120 or less, preferably to about 10° or less, it is possible to reduce or prevent excessive swelling of the surface of the multilayer body 10 in the lamination direction T, which causes the surface of the external electrode 40 to protrude outwardly. More specifically, by setting the slope angle θ within the above range, it becomes easy to set the relationship between the thicknesses of the first middle region EA0 and the second middle region and the thicknesses of the first region EA1, the second region EA2, the third region EB1, and the fourth region EB2 within the range of the present example embodiment. In addition, by setting the slope angle θ within the above-described range, it becomes easy to set the relationship between the distance T0 at the center of the exposed portion of the multilayer body 10, which will be described later, and the maximum distance T1 of the covered portion of the multilayer body, which will be described later, within the range of the present example embodiment, which will be described later.

As shown in FIGS. 2A and 2B, the thickness of the first sloped portion FA1 gradually decreases toward the first end surface LS1. As shown in FIGS. 2A and 2B, the thickness of the second sloped portion FA2 gradually decreases toward the second end surface LS2.

As shown in FIGS. 2A and 2B, the thickness of the third sloped portion FB1 gradually decreases toward the second end surface LS2. As shown in FIGS. 2A and 2B, the thickness of the fourth sloped portion FB2 gradually decreases toward the first end surface LS1.

If there is a portion where the thickness of the internal electrode layer 30 rapidly changes, there is a possibility that a portion is provided where the distance between the internal electrode layers 30 sandwiching the dielectric layer 20 is locally short. In this case, since the electric field concentrates on the portion, the reliability of the multilayer ceramic capacitor 1 may be reduced. However, with the above configuration, since it is possible to reduce or prevent the formation of the portion where the distance between the internal electrode layers 30 is locally short in the vicinity of the sloped portion, it is possible to reduce or prevent the decrease in the reliability of the multilayer ceramic capacitor 1 due to electric field concentration while increasing the capacitance without increasing the size of the multilayer ceramic capacitor 1.

In addition, since it is possible to reduce or prevent stress concentration in the sloped portion, it is possible to increase the capacitance without increasing the size of the multilayer ceramic capacitor 1, and it is possible to further reduce or prevent the occurrence of cracks in the multilayer body.

As shown in FIG. 2B, the level difference distance 1*s*1 in the lamination direction T between the first region EA1 and the first middle region EA0 caused by the first sloped portion FA1 is larger than the thickness Tc of the dielectric layer 20 provided between the internal electrode layers 30 in the lamination direction T. More preferably, the level difference distance 1*s*1 in the lamination direction T between the first region EA1 and the first middle region EA0 caused by the first sloped portion FA1 is larger than the sum Tt of the thickness Te of the internal electrode layer 30 in the lamination direction T and the thickness Tc of the dielectric layer 20 in the lamination direction T (Te+Tc). More preferably, the level difference distance 1*s*1 in the lamination direction T between the first region EA1 and the first middle region EA0 caused by the first sloped portion FA1 is two times or more the sum Tt of the thickness Te in the lamination direction T of the internal electrode layers 30 and the thickness Tc in the lamination direction T of the dielectric layers 20. Further, the level difference distance 1*s*1 in the lamination direction T between the first region EA1 and the first middle region EA0 caused by the first sloped portion FA1 may be three times or more the sum Tt of the thickness Te in the lamination direction T of the internal electrode layers 30 and the thickness Tc in the lamination direction T of the dielectric layers 20.

As shown in FIG. 2B, the level difference distance 1*s*2 in the lamination direction T between the second region EA2 and the first middle region EA0 caused by the second sloped portion FA2 is larger than the thickness Tc of the dielectric layer 20 provided between the internal electrode layers 30 in the lamination direction T. More preferably, the level difference distance 1*s*2 in the lamination direction T between the second region EA2 and the first middle region EA0 caused by the second sloped portion FA2 is larger than the sum Tt of the thickness Te of the internal electrode layer 30 in the lamination direction T and the thickness Tc of the dielectric layer 20 in the lamination direction T (Te+Tc). More preferably, the level difference distance 1*s*2 in the lamination direction T between the second region EA2 and the first middle region EA0 caused by the second sloped portion FA2 is two times or more the sum Tt of the thickness Te in the lamination direction T of the internal electrode layer 30 and the thickness Tc in the lamination direction T of the dielectric layers 20. The level difference distance 1*s*2 in the lamination direction T between the second region EA2 and the first middle region EA0 caused by the second sloped portion FA2 may be three times or more the sum Tt of the thickness Te in the lamination direction T of the internal electrode layer 30 and the thickness Tc in the lamination direction T of the dielectric layers 20.

As shown in FIG. 2B, the level difference distance 1*s*3 in the lamination direction T between the third region EB1 and the second middle region EB0 caused by the third sloped portion FB1 is larger than the thickness Tc of the dielectric layer 20 provided between the internal electrode layers 30 in the lamination direction T. More preferably, the level difference distance 1s3 in the lamination direction T between the third region EB1 and the second middle region EB0 caused by the third sloped portion FB1 is larger than the sum Tt of the thickness Te of the internal electrode layer 30 in the lamination direction T and the thickness Tc of the dielectric layer 20 in the lamination direction T (Te+Tc). More preferably, the level difference distance 1s3 in the lamination direction T between the third region EB1 and the second middle region EB0 caused by the third sloped portion FB1 is two times or more the sum Tt of the thickness Te in the lamination direction T of the internal electrode layer 30 and the thickness Tc in the lamination direction T of the dielectric layers 20. The level difference distance 1s3 in the lamination direction T between the third region EB1 and the second middle region EB0 caused by the third sloped portion FB1 may be three times or more the sum Tt of the thickness Te in the lamination direction T of the internal electrode layer 30 and the thickness Tc in the lamination direction T of the dielectric layers 20.

As shown in FIG. 2B, the level difference distance 1s4 in the lamination direction T between the fourth region EB2 and the second middle region EB0 caused by the fourth sloped portion FB2 is larger than the thickness Tc of the dielectric layer 20 provided between the internal electrode layers 30 in the lamination direction T. More preferably, the level difference distance 1s4 in the lamination direction T between the fourth region EB2 and the second middle region EB0 caused by the fourth sloped portion FB2 is larger than the sum Tt of the thickness Te of the internal electrode layer 30 in the lamination direction T and the thickness Tc of the dielectric layer 20 in the lamination direction T (Te+Tc). More preferably, the level difference distance 1s4 in the lamination direction T between the fourth region EB2 and the second middle region EB0 caused by the fourth sloped portion FB2 is two times or more the sum Tt of the thickness Te in the lamination direction T of the internal electrode layer 30 and the thickness Tc in the lamination direction T of the dielectric layer 20. The level difference distance 1s4 in the lamination direction T between the fourth region EB2 and the second middle region EB0 caused by the fourth sloped portion FB2 may be three times or more the sum Tt of the thickness Te in the lamination direction T of the internal electrode layer 30 and the thickness Tc in the lamination direction T of the dielectric layer 20.

The thickness Te of the internal electrode layer 30 in the lamination direction T refers to the thickness of the internal electrode layer 30 in the lamination direction T in the first middle region EA0 and the second middle region EB0. The thickness Tc of the dielectric layer 20 in the lamination direction T refers to the thickness of the dielectric layer 20 provided between the first middle region EA0 and the second middle region EB0 in the lamination direction T.

With such a configuration, the thickness of the internal electrode layer 30 in each of the first middle region EA0 and the second middle region EB0 can be increased to sufficiently increase the coverage by making use of the level difference caused by the sloped portion, and thus it is possible to further increase the capacitance without increasing the size of the multilayer ceramic capacitor 1.

The level difference distance 1s1 in the lamination direction T between the first region EA1 and the first middle region EA0 caused by the first sloped portion FA1 may be, for example, about 1.6 μm or more, and may be about 1.6 μm or more and about 16 μm or less. For example, it may be about 2.9 μm or more and about 14.8 μm or less. The level difference distance 1s2 in the lamination direction T between the second region EA2 and the first middle region EA0 caused by the second sloped portion FA2 may be, for example, about 1.6 μm or more, or may be about 1.6 μm or more and about 16 μm or less. For example, it may be about 2.9 μm or more and about 14.8 μm or less. The level difference distance 1s3 in the lamination direction T between the third region EB1 and the second middle region EB0 caused by the third sloped portion FB1 may be, for example, about 1.6 μm or more, and may be about 1.6 μm or more and about 16 μm or less. For example, it may be about 2.9 μm or more and about 14.8 μm or less. The level difference distance 1s4 in the lamination direction T between the fourth region EB2 and the second middle region EB0 caused by the fourth sloped portion FB2 may be, for example, about 1.6 μm or more, and may be about 1.6 μm or more and 16 μm or less. For example, it may be about 2.9 μm or more and about 14.8 μm or less.

The first internal electrode layer 31 further includes a fifth sloped portion FA3 located at the first extension portion D1. The second internal electrode layer 32 further includes a sixth sloped portion FB3 located at the second extension portion D2.

With such a configuration, it is possible to maintain a long distance of the intrusion path of moisture from the outside, such that it is possible to increase the capacitance and to maintain moisture resistance without increasing the size of the multilayer ceramic capacitor 1.

Moisture of a plating solution or the like may infiltrate from the interface between the multilayer body 10 and the external electrode layer. By providing the fifth sloped portion FA3 and the sixth sloped portion FB3, it is possible to increase the distance of the intrusion path to the end portion of the internal electrode layer 30 through the interface. Therefore, it is possible to increase the capacitance and maintain the moisture resistance without increasing the size of the multilayer ceramic capacitor 1.

In addition, moisture of a plating solution or the like may infiltrate from the surface of the external electrode 40 in the thickness direction of the external electrode 40. With the fifth sloped portion FA3 and the sixth sloped portion FB3, it is possible to provide the end portion of each of the internal electrode layers 30 at a position closer to the center in the height direction of the multilayer body 10 where the thickness of the external electrode 40 in the length direction L is likely to become thick. Therefore, it is possible to increase the capacitance and maintain the moisture resistance without increasing the size of the multilayer ceramic capacitor 1.

With the fifth sloped portion FA3 and the sixth sloped portion FB3, it is possible to increase the distance from the end portion of each of the internal electrode layers 30 to the counter portion of the internal electrode layers 30. With such a configuration, it is possible to increase the distance of the moisture intrusion path to the counter portion of the internal electrode layers 30. Therefore, it is possible to increase the capacitance and maintain the moisture resistance without increasing the size of the multilayer ceramic capacitor 1.

The slope angle θ of the first sloped portion FA1 and the second sloped portion FA2 is smaller than the slope angle θ2 of the fifth sloped portion FA3. That is, the slope angle θ of the fifth sloped portion FA3 is larger than the slope angle θ of the first sloped portion FA1 or the second sloped portion FA2.

The slope angle θ2 of the fifth sloped portion FA3 with respect to the first middle region EA0 or the first region EA1 may be, for example, about 10° or more, and may be about 15° or more.

The slope angle θ of the third sloped portion FB1 and the fourth sloped portion FB2 is smaller than the slope angle θ2 of the sixth sloped portion FB3. That is, the slope angle θ2 of the sixth sloped portion FB3 is larger than the slope angles θ of the third sloped portion FB1 and the fourth sloped portion FB2.

The slope angle θ2 of the sixth sloped portion FB3 with respect to the second middle region EB0 or the third region EB1 may be, for example, about 10° or more, and may be about 15° or more.

In FIG. 2B, the slope angle θ2 of the sixth sloped portion FB3 with respect to the second middle region EB0 and the third region EB1 in the second internal electrode layer 32 is shown as an example of the above-described slope angle θ2.

With such a configuration, it is possible to maintain a long distance of the intrusion path of moisture from the outside, such that it is possible to increase the capacitance and to maintain moisture resistance without increasing the size of the multilayer ceramic capacitor 1.

As shown in FIGS. 2A and 2B, the multilayer body 10 includes an exposed portion Ep exposed from the first external electrode 40A and the second external electrode 40B, a first covered portion C1 covered with the first external electrode, and a second covered portion C2 covered with the second external electrode 40B. The distance L1 in the length direction L of the exposed portion Ep exposed from the first external electrode 40A and the second external electrode 40B corresponds to the distance L1 between the first external electrode 40A and the second external electrode 40B.

In the present example embodiment, the distance T0 in the lamination direction T at the center of the exposed portion Ep in the length direction L is longer than the maximum distance T1 which is the maximum value of the distance in the lamination direction T between the surface of the first covered portion C1 adjacent to the first main surface TS1 and the surface of the first covered portion C1 adjacent to the second main surface TS2. In addition, in the present example embodiment, the distance T0 in the lamination direction T at the center of the exposed portion Ep in the length direction L is longer than the maximum distance T1 which is the maximum value of the distance in the lamination direction T between the surface of the second covered portion C2 adjacent to the first main surface TS1 and the surface of the second covered portion C2 adjacent to the second main surface TS2. In the present example embodiment, the distance T0 in the lamination direction T at the center of the exposed portion Ep in the length direction L is the maximum distance in the lamination direction T of the exposed portion Ep of the multilayer body 10.

With such a configuration, it is possible to increase the thickness of each of the internal electrode layers 30 in the first middle region EA0 and the second middle region EB0, thus increasing the coverage and increasing the capacitance, while reducing or preventing an increase in size of the multilayer ceramic capacitor 1.

The distance T0 in the lamination direction T at the center of the exposed portion Ep in the length direction L is, for example, preferably about 103.2% or less of the maximum distance T1 in the lamination direction T between the surface of the first covered portion C1 adjacent to the first main surface TS1 and the surface of the first covered portion C1 adjacent to the second main surface TS2. For example, the distance T0 in the lamination direction T at the center of the exposed portion Ep in the length direction L may be about 100.6% or more and about 103.2% or less of the maximum distance T1 in the lamination direction T between the surface of the first covered portion C1 adjacent to the first main surface TS1 and the surface of the first covered portion C1 adjacent to the second main surface TS2. More preferably, the distance T0 in the lamination direction T at the center of the exposed portion Ep in the length direction L may be, for example, about 100.6% or more and about 102.7% or less of the maximum distance T1 in the lamination direction T between the surface of the first covered portion C1 adjacent to the first main surface TS1 and the surface of the first covered portion C1 adjacent to the second main surface TS2. In addition, in the present example embodiment, the distance in the lamination direction T between a flat portion PA1 and a flat portion PB1 described later is the above-described maximum distance T1.

The distance T0 in the lamination direction T at the center of the exposed portion Ep in the length direction L is, for example, preferably about 103.2% or less of the maximum distance T1 in the lamination direction T between the surface of the second covered portion C2 adjacent to the first main surface TS1 and the surface of the second covered portion C2 adjacent to the second main surface TS2. For example, the distance T0 in the lamination direction T at the center of the exposed portion Ep in the length direction L may be about 100.6% or more and about 103.2% or less of the maximum distance T1 in the lamination direction T between the surface of the second covered portion C2 adjacent to the first main surface TS1 and the surface of the second covered portion C2 adjacent to the second main surface TS2. More preferably, the distance T0 in the lamination direction T at the center of the exposed portion Ep in the length direction L may be, for example, about 100.6% or more and about 102.7% or less of the maximum distance T1 in the lamination direction T between the surface of the second covered portion C2 adjacent to the first main surface TS1 and the surface of the second covered portion C2 adjacent to the second main surface TS2. In addition, in the present example embodiment, the distance in the lamination direction T between a flat portion PA2 and a flat portion PB2 described later is the above-described maximum distance T1.

The distance T0 in the lamination direction T at the center of the exposed portion Ep in the length direction L is shorter than the maximum distance T2 which is the maximum value of the distance in the lamination direction T between the first main surface TS1-side surface and the second main surface TS2-side surface of the first external electrode 40A, each of which functions as an outermost surface and is exposed to the outside. In addition, the distance T0 in the lamination direction T at the center of the exposed portion Ep in the length direction L is shorter than the maximum distance T2 which is the maximum value of the distance in the lamination direction T between the first main surface TS1-side surface and the second main surface TS2-side surface of the second external electrode 40B, each of which functions as an outermost surface and is exposed to the outside.

With such a configuration, it is possible to increase the thickness of each of the internal electrode layers 30 in the first middle region EA0 and the second middle region EB0, thus increasing the coverage and increasing the capacitance, while reducing or preventing an increase in size of the multilayer ceramic capacitor 1.

In addition, the ratio of the thickness of each of the first internal electrode layers 31 in the lamination direction T in the first middle region EA0 to the thickness of each of the first internal electrode layers 31 in the lamination direction T in the first region EA1 may be set to be larger than the ratio of the distance T0 in the lamination direction T at the center in the length direction L of the exposed portion Ep of the multilayer body 10 to the maximum distance T1 in the lamination direction T of the first covered portion C1 of the multilayer body 10. The ratio of the thickness of each of the second internal electrode layers 32 in the second middle region EB0 to the thickness of each of the second internal electrode layers 32 in the third region EB1 in the lamination direction T may be set to be larger than the ratio of the distance T0 in the lamination direction T at the center of the exposed portion Ep of the multilayer body 10 in the length direction L to the maximum distance T1 in the lamination direction T of the second covered portion C2 of the multilayer body 10.

As shown in FIG. 2A, the first main surface TS1 includes a first exposed surface EpsA exposed from the first external electrode 40A and the second external electrode 40B, a first covered surface C1*s*A covered by the first external electrode 40A, and a second covered surface C2*s*A covered by the second external electrode 40B.

As shown in FIGS. 1 and 2A, the first exposed surface EpsA includes a first flat surface PA0 parallel or substantially parallel to the lamination direction T, a first sloped surface FC1 coupling the first flat surface PA0 and the first covered surface C1*s*A, and a second sloped surface FC2 coupling the first flat surface PA0 and the second covered surface C2*s*A. In the present example embodiment, the flat portion PA1 is provided in the first covered surface C1*s*A adjacent to the middle of the multilayer body, and the first sloped surface FC1 couples the first flat surface PA0 and the flat portion PA1. In addition, a flat portion PA2 is provided in the second covered surface C2*s*A adjacent to the middle of the multilayer body, and the second sloped surface FC2 couples the first flat surface PA0 and the flat portion PA2. That is, the first main surface TS1 of the present example embodiment includes the flat portion PA1 adjacent to the first end surface LS1, the flat portion PA2 adjacent to the second end surface LS2, the first flat surface PA0 provided between the flat portion PA1 and the flat portion PA2 and protruding from the flat portion PA1 and the flat portion PA2, the first sloped surface FC1 coupling the first flat surface PA0 and the flat portion PA1, and the second sloped surface FC2 coupling the first flat surface PA0 and the flat portion PA2.

As shown in FIG. 2A, the second main surface TS2 includes a second exposed surface EpsB exposed from the first external electrode 40A and the second external electrode 40B, a third covered surface C1*s*B covered by the first external electrode 40A, and a fourth covered surface C2*s*B covered by the second external electrode.

The second exposed surface EpsB includes a second flat surface PB0 parallel or substantially parallel to the lamination direction T, a third sloped surface FC3 coupling the second flat surface PB0 and the third covered surface C1*s*B, and a fourth sloped surface FC4 coupling the second flat surface PB0 and the fourth covered surface C2*s*B. In the present example embodiment, a flat portion PB1 is provided in the third covered surface C1*s*B adjacent to the middle of the multilayer body, and the third sloped surface FC3 couples the second flat surface PB0 and the flat portion PB1. In addition, a flat portion PB2 is provided in the fourth covered surface C2*s*B adjacent to the middle of the multilayer body, and the fourth sloped surface FC4 couples the second flat surface PB0 and the flat portion PB2. That is, the second main surface TS2 of the present example embodiment includes the flat portion PB1 adjacent to the first end surface LS1, the flat portion PB2 adjacent to the second end surface LS2, the second flat surface PB0 provided between the flat portion PB1 and the flat portion PB2 and protruding from the flat portion PB1 and the flat portion PB2, the third sloped surface FC3 coupling the second flat surface PB0 and the flat portion PB1, and the fourth sloped surface FC4 coupling the second flat surface PB0 and the flat portion PB2.

With such a configuration, the areas of the first middle region EA0 and the second middle region EB0 having high coverage can be easily maintained corresponding to the first flat surface PA0 or the second flat surface PB0, and it is possible to increase the capacitance without increasing the size of the multilayer ceramic capacitor 1. In addition, with the flat surface, it is possible to reduce or prevent suction failure at the time of mounting.

The distance Lt1 in the length direction L of the first sloped surface FC1 and the distance Lt2 in the length direction L of the second sloped surface FC2 are shorter than the distance Lt0 in the length direction L of the first flat surface PA0. The distance Lt1 in the length direction L of the third sloped surface FC3 and the distance Lt2 in the length direction L of the fourth sloped surface FC4 are shorter than the distance Lt0 in the length direction L of the second flat surface PB0.

With such a configuration, the areas of the first middle region EA0 and the second middle region EB0 having high coverage can be easily maintained corresponding to the first flat surface PA0 or the second flat surface PB0, and it is possible to increase the capacitance without increasing the size of the multilayer ceramic capacitor 1. In addition, by maintaining the area of the flat surface, it is possible to reduce or prevent suction failure at the time of mounting.

In the present example embodiment, in the length direction L, the distance Lt0 of the first flat surface PA0 is shorter than the distance L1 between the first external electrode 40A and the second external electrode 40B. In addition, in the length direction L, the distance Lt0 of the second flat surface PB0 is shorter than the distance L1 between the first external electrode 40A and the second external electrode 40B. As described above, it is preferable that the distance Lt0 in the length direction L of the first flat surface PA0 and the second flat surface PB0 is within the range of the distance L1 between the first external electrode 40A and the second external electrode 40B in the length direction L. In addition, the end portion 40AE of the first external electrode 40A may be located at the first sloped surface FC1 and the third sloped surface FC3, or may be located at the flat portion PA1 and the flat portion PB1 which are located closer to the first end surface LS1 than the first sloped surface FC1 and the third sloped surface FC3. The end portion 40BE of the second external electrode 40B may be located at the second sloped surface FC2 and the fourth sloped surface FC4, or may be located at the flat portion PA2 and the flat portion PB2 which are located closer to the second end surface LS2 than the second sloped surface FC2 and the fourth sloped surface FC4. In the present example embodiment, the end portion 40AE of the first external electrode 40A is located in the vicinity of the boundary portion between the first sloped surface FC1 and the flat portion PA1, and in the vicinity of the boundary portion between the third sloped surface FC3 and the flat portion PB1. Further, the end portion 40BE of the second external electrode 40B is located in the vicinity of the boundary portion between the second sloped surface FC2 and the flat portion PA2, and in the vicinity of the boundary portion between the fourth sloped surface FC4 and the flat portion PB2.

With such a configuration, it is possible to increase the thickness of each of the internal electrode layers 30 in the first middle region EA0 and the second middle region EB0, thereby increasing the coverage and increasing the capacitance, while reducing or preventing an increase in size of the multilayer ceramic capacitor 1.

The slope angle φ of the first sloped surface FC1 with respect to the first flat surface PA0 is, for example, preferably about 1° or more. For example, the slope angle φ of the first sloped surface FC1 with respect to the first flat surface PA0 may be about 1° or more and about 10° or less. More preferably, the slope angle φ of the first sloped surface FC1 with respect to the first flat surface PA0 may be, for example, about 2° or more and about 5° or less.

The slope angle φ of the second sloped surface FC2 with respect to the first flat surface PA0 is, for example, preferably about 1° or more. For example, the slope angle φ of the second sloped surface FC2 with respect to the first flat surface PA0 may be about 1° or more and about 10° or less. More preferably, the slope angle φ of the second sloped surface FC2 with respect to the first flat surface PA0 may be, for example about 2° or more and about 50 or less.

The slope angle φ of the third sloped surface FC3 with respect to the second flat surface PB0 is, for example, preferably about 1° or more. For example, the slope angle φ of the third sloped surface FC3 with respect to the second flat surface PB0 may be about 1° or more and about 100 or less. More preferably, the slope angle φ of the third sloped surface FC3 with respect to the second flat surface PB0 may be, for example, about 2° or more and about 50 or less.

The slope angle φ of the fourth sloped surface FC4 with respect to the second flat surface PB0 is, for example preferably about 1° or more. For example, the slope angle φ of the fourth sloped surface FC4 with respect to the second flat surface PB0 may be about 1° or more and about 10° or less. More preferably, the slope angle φ of the fourth sloped surface FC4 with respect to the second flat surface PB0 may be, for example, about 2° or more and about 50 or less.

FIG. 2A shows the slope angle φ of the fourth sloped surface FC4 with respect to the second flat surface PB0 in the second main surface TS2 as an example of the above-described slope angle φ.

With such a configuration, it is possible to increase the thickness of each of the internal electrode layers 30 in the first middle region EA0 and the second middle region EB0, thereby increasing the coverage and increasing the capacitance, while reducing or preventing an increase in size of the multilayer ceramic capacitor 1. Specifically, by setting the slope angle φ to about 1° or more, and preferably about 2° or more, it is possible to maintain a region for increasing the thickness of each of the internal electrode layers 30 in the first middle region EA0 and the second middle region EB0. Further, by setting the above-described slope angle φ to about 10° or less, and preferably to about 5° or less, it is possible to reduce or prevent excessive swelling of the surface of the multilayer body 10 in the lamination direction T which causes the surface of the external electrode 40 to protrude outwardly. More specifically, by setting the slope angle φ within the above range, it becomes easy to set the relationship between the thicknesses of the first middle region EA0 and the second middle region and the thicknesses of the first region EA1, the second region EA2, the third region EB1, and the fourth region EB2 within the range of the present example embodiment. Further, by setting the slope angle φ within the above range, it becomes easy to set the relationship between the distance TO at the center of the exposed portion of the multilayer body 10 and the maximum distance T1 at the covered portion of the multilayer body within the range of the present example embodiment.

The first flat surface PA0 is preferably parallel or substantially parallel to a surface orthogonal or substantially orthogonal to the lamination direction T. The first flat surface PA0 is preferably parallel or substantially parallel to the flat portion PA1 and the flat portion PA2. More preferably, the first flat surface PA0, the flat portion PA1, and the flat portion PA2 are parallel or substantially parallel to a surface orthogonal or substantially orthogonal to the lamination direction T.

The second flat surface PB0 is preferably substantially parallel to a surface orthogonal to the lamination direction T. The second flat surface PB0 is preferably parallel or substantially parallel to the flat portion PB1 and the flat portion PB2. More preferably, the second flat surface PB0, the flat portion PB1, and the flat portion PB2 are parallel or substantially parallel to a surface orthogonal or substantially orthogonal to the lamination direction T.

With such a configuration, it is possible to reduce or prevent the formation of a portion having a locally large size in the multilayer ceramic capacitor 1, and it is possible to increase the capacitance without increasing the size of the multilayer ceramic capacitor 1.

As shown in FIG. 2A, the level difference distance tf in the lamination direction T between the first flat surface PA0, and the flat portions PA1 and PA2 provided by the first sloped surface FC1 and the second sloped surface FC2, that is, a raised height tf of the first flat surface PA0 provided by the first sloped surface FC1 and the second sloped surface FC2 (a swelling dimension on one side of the multilayer body) is preferably smaller than the thickness tg in the lamination direction T of the first external electrode 40A and the second external electrode 40B provided on the first main surface TS1. The level difference distance tf in the lamination direction T between the second flat surface PB0, and the flat portions PB1 and PB2 provided by the third sloped surface FC3 and the fourth sloped surface FC4, that is, the raised height tf of the second flat surface PB0 provided by the third sloped surface FC3 and the fourth sloped surface FC4 (a swelling dimension on one side of the multilayer body) is preferably smaller than the thickness tg in the lamination direction T of the first external electrode 40A and the second external electrode 40B provided on the second main surface TS2.

With such a configuration, it is possible to increase the capacitance while reducing or preventing an increase in size of the multilayer ceramic capacitor 1.

The raised height tf of the first flat surface PA0 provided by the first sloped surface FC1 and the second sloped surface FC2 is, for example, preferably about 2.9 μm or more and about 14.8 μm or less. The raised height tf of the first flat surface PA0 provided by the first sloped surface FC1 and the second sloped surface FC2 may be, for example, about 2.9 μm or more and 12.6 μm or less. The raised height tf of the second flat surface PB0 provided by the third sloped surface FC3 and the fourth sloped surface FC4 is, for example, preferably about 2.9 μm or more and about 14.8 μm or less. The raised height tf of the second flat surface PB0 provided by the third sloped surface FC3 and the fourth sloped surface FC4 may be, for example, about 2.9 μm or more and about 12.6 μm or less.

The raised height tf of the first flat surface PA0 provided by the first sloped surface FC1 and the second sloped surface FC2 is larger than the thickness Tc in the lamination direction T of the dielectric layer 20 provided between the internal electrode layers 30. More preferably, the raised height tf of the first flat surface PA0 provided by the first sloped surface FC1 and the second sloped surface FC2 is larger than the sum Tt of the thickness Te of each of the internal electrode layers 30 in the lamination direction T and the thickness Tc of each of the dielectric layers 20 in the lamination direction T (Te+Tc). More preferably, the raised height tf of the first flat surface PA0 provided by the first sloped surface FC1 and the second sloped surface FC2 is two times or more the sum Tt of the thickness Te of each of the internal electrode layers 30 in the lamination direction T and the thickness Tc of each of the dielectric layers 20 in the lamination direction T. Further, the raised height tf of the first flat surface PA0 provided by the first sloped surface FC1 and the second sloped surface FC2 may be three times or more the sum Tt of the thickness Te of each of the internal electrode layers 30 in the lamination direction T and the thickness Tc of each of the dielectric layers 20 in the lamination direction T.

The raised height tf of the second flat surface PB0 provided by the third sloped surface FC3 and the fourth sloped surface FC4 is larger than the thickness Tc in the lamination direction T of each of the dielectric layers 20 provided between the internal electrode layers 30. More preferably, the raised height tf of the second flat surface PB0 provided by the third sloped surface FC3 and the fourth sloped surface FC4 is larger than the sum Tt of the thickness Te of each of the internal electrode layers 30 in the lamination direction T and the thickness Tc of each of the dielectric layers 20 in the lamination direction T (Te+Tc). More preferably, the raised height tf of the second flat surface PB0 provided by the third sloped surface FC3 and the fourth sloped surface FC4 is two times or more the sum Tt of the thickness Te of each of the internal electrode layers 30 in the lamination direction T and the thickness Tc of each of the dielectric layers 20 in the lamination direction T. Further, the raised height tf of the second flat surface PB0 provided by the third sloped surface FC3 and the fourth sloped surface FC4 may be three times or more the sum Tt of the thickness Te of each of the internal electrode layers 30 in the lamination direction T and the thickness Tc of each of the dielectric layers 20 in the lamination direction T.

With such a configuration, it is possible to maintain the region in which the thickness of the internal electrode layer 30 in each of the first middle region EA0 and the second middle region EB0 can be increased to sufficiently increase the coverage by making use of the level difference caused by the sloped portion, and thus it is possible to further increase the capacitance without increasing the size of the multilayer ceramic capacitor 1.

A thickness t01 in the lamination direction T in the region of the first flat surface PA0 of the first main surface-side outer layer portion 12 is smaller than a thickness t11 in the lamination direction T in the region of the first covered surface C1*s*A of the first main surface-side outer layer portion 12 or a thickness t21 in the lamination direction T in the region of the second covered surface C2*s*A of the first main surface-side outer layer portion 12.

A thickness t02 in the lamination direction T in the region of the second flat surface PB0 of the second main surface-side outer layer portion 13 is smaller than a thickness t12 in the lamination direction T in the region of the first covered surface C1*s*A of the second main surface-side outer layer portion 13 or a thickness t22 in the lamination direction T in the region of the second covered surface C2*s*A of the second main surface-side outer layer portion 13.

With such a configuration, the distance between the external electrode 40 and the internal electrode layer 30 is maintained to be relatively long while the capacitance is increased without increasing the size of the multilayer ceramic capacitor 1, such that electric field concentration can be suppressed and, therefore, it is possible to reduce or prevent a decrease in the reliability of the multilayer ceramic capacitor 1 due to electric field concentration.

In addition, by maintaining the distances of the thicknesses t11, t21, t12, and t22 to be relatively long, even if cracks occur in the multilayer body 10 in the vicinity of the end portion of the external electrode 40 such as in the vicinity of the boundary between the exposed portion Ep of the multilayer body 10 and the first covered portion C1 or the second covered portion C2, it is possible to reduce or prevent the cracks reaching the internal electrode.

In addition, in the present example embodiment, with the above-described sloped surfaces, the flat surface functioning as a portion of the surface of the multilayer body 10 swells on each of the first main surface TS1 and the second main surface TS2; however, the flat surface functioning as a portion of the surface of the multilayer body 10 may swell on either one of the first main surface TS1 or the second main surface TS2.

As shown in FIGS. 2A and 2B, the thickness in the length direction L of the first external electrode 40A in the middle in the lamination direction T is thicker than the thickness in the length direction L of the first external electrode 40A adjacent to the first main surface TS1 in the lamination direction T or the thickness in the length direction L of the first external electrode 40A adjacent to the second main surface TS2 in the lamination direction T. As shown in FIGS. 4A and 4B, the thickness in the length direction L of the first external electrode 40A in the middle in the width direction W is thicker than the thickness in the length direction L of the first external electrode 40A adjacent to the first lateral surface WS1 in the width direction W and the thickness in the length direction L of the first external electrode 40A adjacent to the second lateral surface WS2 in the width direction W.

As shown in FIGS. 2A and 2B, the thickness in the length direction L of the second external electrode 40B in the middle in the lamination direction T is thicker than the thickness in the length direction L of the second external electrode 40B adjacent to the first main surface TS1 in the lamination direction T and the thickness in the length direction L of the second external electrode 40B adjacent to the second main surface TS2 in the lamination direction T. As shown in FIGS. 4A and 4B, the thickness in the length direction L of the second external electrode 40B in the middle in the width direction W is thicker than the thickness in the length direction L of the second external electrode 40B adjacent to the first lateral surface WS1 in the width direction W and the thickness in the length direction L of the second external electrode 40B adjacent to the second lateral surface WS2 in the width direction W.

With such a configuration, it is possible to maintain a long distance of the intrusion path of moisture from the outside, such that it is possible to increase the capacitance and to maintain moisture resistance without increasing the size of the multilayer ceramic capacitor 1.

The first internal electrode layers 31 of the present example embodiment preferably include the above-described first middle region EA0 having a higher coverage and a thicker thickness than the first region EA1 and the second region EA2 in the first main surface-side inner layer portion 112, the second main surface-side inner layer portion 113, and the middle inner layer portion 111. However, the first internal electrode layer 31 may include the first middle region EA0 having a higher coverage and a thicker thickness than those of the first region EA1 and the second region EA2 at least in any portion of the first main surface-side inner layer portion 112 or the second main surface-side inner layer portion 113. With such a configuration, it is possible to increase the capacitance without increasing the size of the multilayer ceramic capacitor 1.

The second internal electrode layers 32 of the present example embodiment preferably include the above-described second middle region EB0 having a higher coverage and a thicker thickness than the third region EB1 and the fourth region EB2 in the first main surface-side inner layer portion 112, the second main surface-side inner layer portion 113, and the middle inner layer portion 111. However, the second internal electrode layer 32 may have the above-described second middle region EB0 having a higher coverage and a thicker thickness than the third region EB1 and the fourth region EB2 at least in any portion of the first main surface-side inner layer portion 112 or the second main surface-side inner layer portion 113. With such a configuration, it is possible to increase the capacitance without increasing the size of the multilayer ceramic capacitor 1.

In the present example embodiment, the first sloped portion FA1, the second sloped portion FA2, the third sloped portion FB1, the fourth sloped portion FB2, the fifth sloped portion FA3, and the sixth sloped portion FB3 are provided in the first main surface-side inner layer portion 112 and the second main surface-side inner layer portion 113. However, the first sloped portion FA1, the second sloped portion FA2, the third sloped portion FB1, the fourth sloped portion FB2, the fifth sloped portion FA3, and the sixth sloped portion FB3 may be provided at least in any portion of the first main surface-side inner layer portion 112 or the second main surface-side inner layer portion 113.

The first internal electrode layers 31 of the present example embodiment preferably include the above-described first middle region EA0 having a higher coverage and a thicker thickness than the first region EA1 and the second region EA2 in the first lateral surface-side counter electrode portion 112E, the second lateral surface-side counter electrode portion 113E, and the middle counter electrode portion 111E. Although the present invention is not limited thereto, in addition to the middle counter electrode portion 111E, the first lateral surface-side counter electrode portion 112E and the second lateral surface-side counter electrode portion 113E also include the above-described first middle region EA0 having higher coverage and thicker thickness than the first region EA1 and the second region EA2, such that the area of the first middle region EA0 having higher coverage can be maintained, and thus it is possible to increase the capacitance without increasing the size of the multilayer ceramic capacitor 1. In addition, at least the middle counter electrode portion 111E may include the first middle region EA0 having a higher coverage and a thicker thickness than the first region EA1 and the second region EA2.

The second internal electrode layers 32 of the present example embodiment preferably include the above-described second middle region EB0 having a higher coverage and a thicker thickness than the third region EB1 and the fourth region EB2 in the first lateral surface-side counter electrode portion 112E, the second lateral surface-side counter electrode portion 113E, and the middle counter electrode portion 111E. Although the present disclosure is not limited thereto, in addition to the middle counter electrode portion 111E, the first lateral surface-side counter electrode portion 112E and the second lateral surface-side counter electrode portion 113E also include the second middle region EB0 having a higher coverage and a thicker thickness than the third region EB1 and the fourth region EB2, such that the area of the second middle region EB0 having a higher coverage can be maintained, and thus it is possible to increase the capacitance without increasing the size of the multilayer ceramic capacitor 1. In addition, at least the middle counter electrode portion 111E may include the second middle region EB0 having a higher coverage and a thicker thickness than the third region EB1 and the fourth region EB2.

Figure 5:
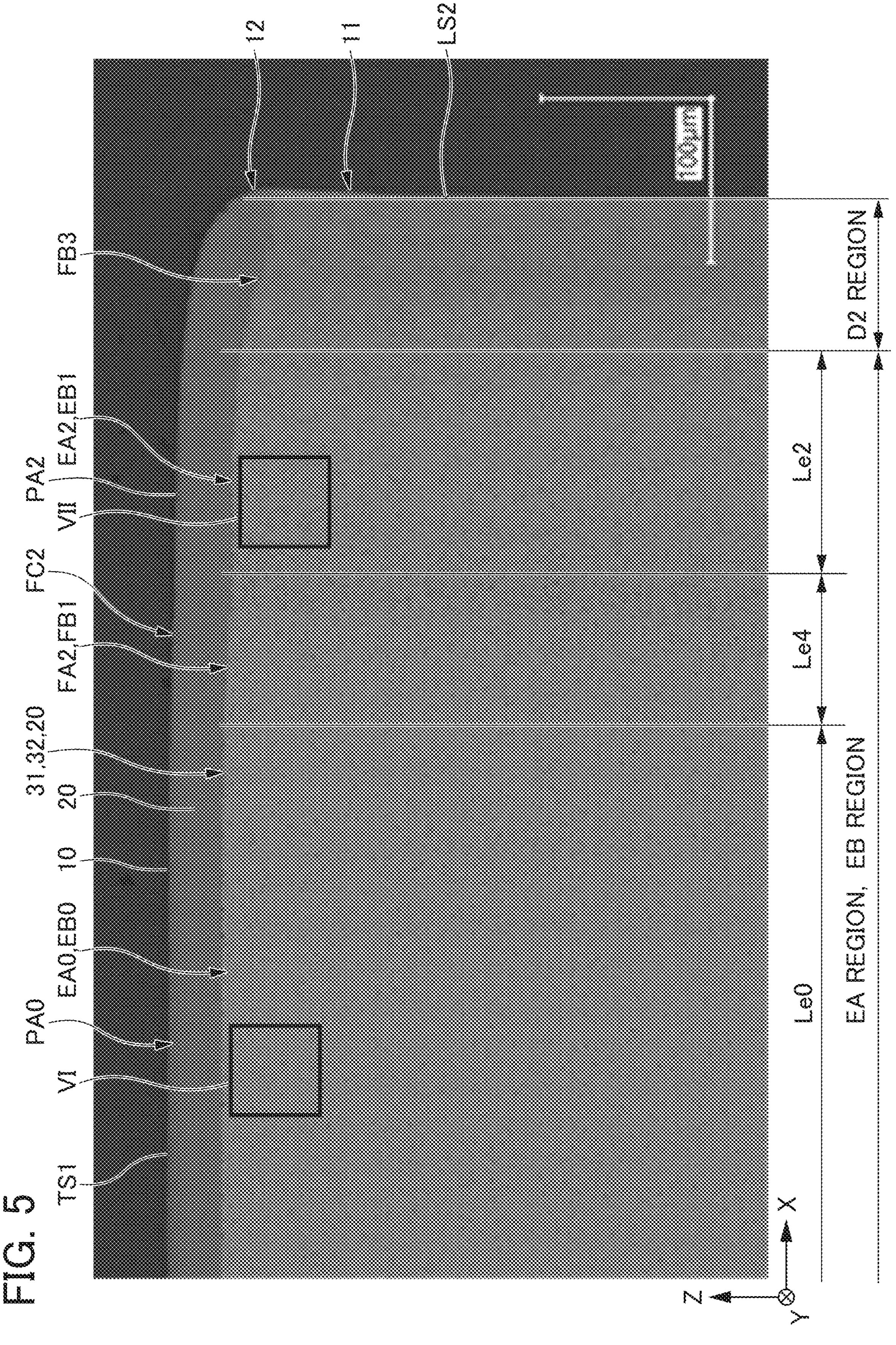
FIG. 5 is a photograph showing a portion of a cross section of a multilayer body.
Figure 6:
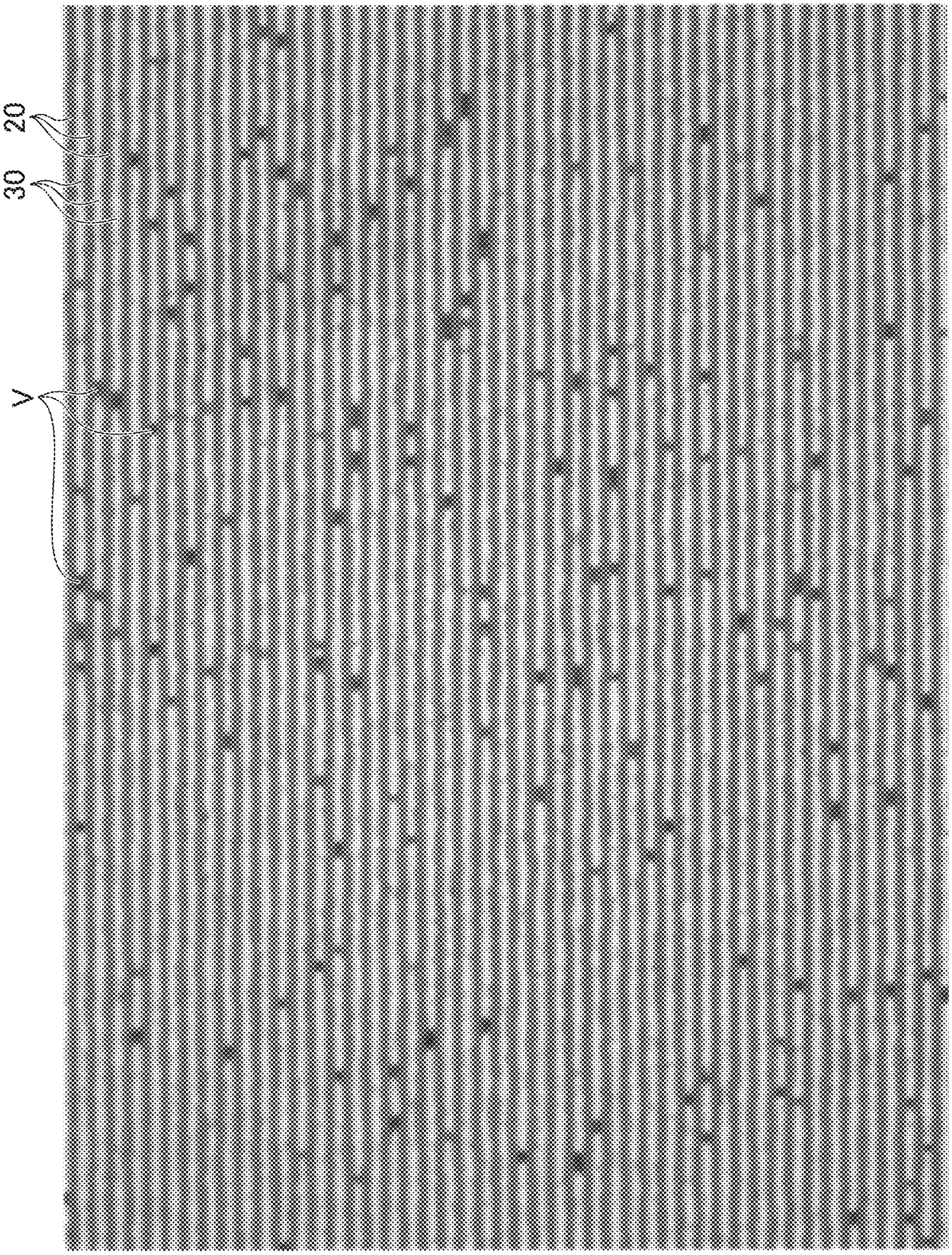
FIG. 6 is an enlarged photograph of a portion including a first middle region and a second middle region of the internal electrode layer in the photograph of FIG. 5.
Figure 7:
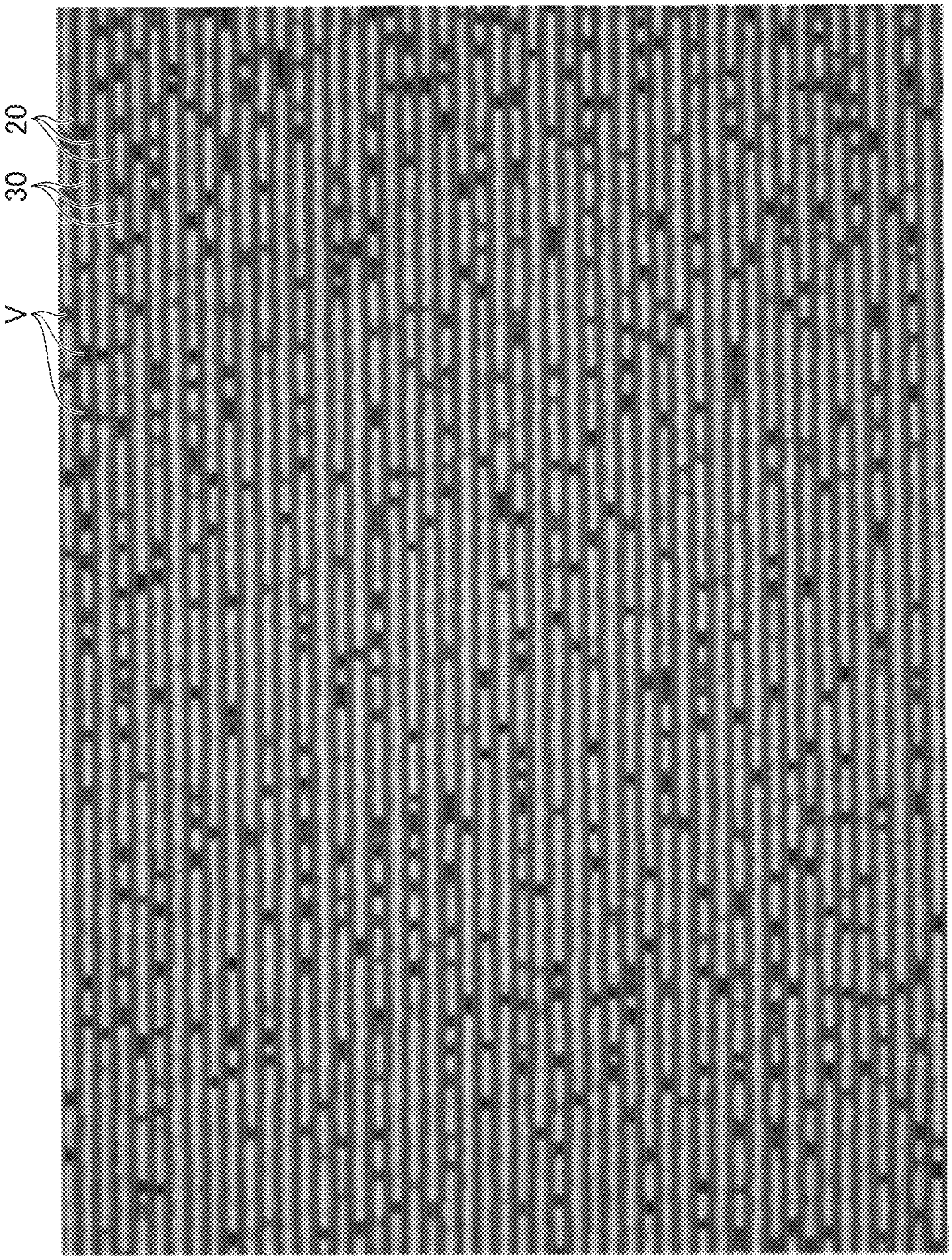
FIG. 7 is an enlarged photograph of a portion including a second region and a third region of the internal electrode layer in the photograph of FIG. 5.

FIGS. 5 to 7 are views each showing an example of an enlarged image of a cross section of the multilayer ceramic capacitor 1 of the present example embodiment observed with an optical microscope.

FIG. 5 is a photograph showing a portion of a cross section of the multilayer body 10. FIG. 5 is a cross-sectional photograph showing an upper right region of the multilayer body 10 in FIG. 2B, and is a cross-sectional photograph including a partial region of the first main surface-side inner layer portion 112. The upper left region, the lower right region, and the lower left region of the multilayer body 10 in FIG. 2B basically conform to the upper right region shown in FIG. 5 in left-right symmetry, vertical symmetry, and rotational symmetry. Thus, these regions will be described using the photograph in FIG. 5 as an example. FIG. 5 is a cross-sectional photograph of the multilayer body 10 in a state where the external electrode 40 is not provided.

FIG. 6 is an enlarged photograph of a portion VI including the first middle region EA0 of the first internal electrode layer 31 and the second middle region EB0 of the second internal electrode layer 32 in the photograph of FIG. 5. FIG. 7 is an enlarged photograph of a portion VII including the second region EA2 of the first internal electrode layer 31 and the third region EB1 of the second internal electrode layer 32 in the photograph of FIG. 5.

From the optical micrograph of FIG. 5, it can be confirmed that the multilayer body 10 includes the inner layer portion 11 and the first main surface-side outer layer portion 12 including the dielectric layers 20.

From the optical micrograph of FIG. 5, a portion in which the first internal electrode layers 31 and the second internal electrode layers 32 functioning as the internal electrode layers 30 are provided can be confirmed in the inner layer portion 11. It can be confirmed from the optical micrographs of FIGS. 6 and 7 that the dielectric layers 20 are provided between the plurality of internal electrode layers 30.

From the optical micrograph of FIG. 5, it can be confirmed that the multilayer body 10 includes a region where the first counter portion EA of the first internal electrode layers 31 and the second counter portion EB of the second internal electrode layers 32 are present (EA region and EB region), and a region where the second extension portion D2 of the second internal electrode layer 32 is present (D2 region).

According to the optical micrograph of FIG. 5, it can be confirmed that the multilayer body 10 includes a region, indicated by the range of distance Le0, in which the first middle region EA0 of the first internal electrode layer 31 and the second middle region EB0 of the second internal electrode layer 32 are present, a region, indicated by the range of the distance Le2, in which the second region EA2 of the first internal electrode layer 31 and the third region EB1 of the second internal electrode layer 32 are present, and a region, indicated by the range of the distance Le4, in which the second sloped portion FA2 of the first internal electrode layer 31 and the third sloped portion FB1 of the second internal electrode layer 32 are present. In addition, it can be confirmed that the sixth sloped portion FB3 is present in the region of the second extension portion D2 of the second internal electrode layer 32.

Further, from the optical micrograph of FIG. 5, it can be confirmed that the first main surface TS1 of the multilayer body 10 includes the first flat surface PA0 parallel or substantially parallel to the lamination direction T, the flat portion PA2, and the second sloped surface FC2 coupling the first flat surface PA0 and the flat portion PA2.

Here, the coverage of the first middle region EA0 and the second middle region EB0 and the coverage of the second region EA2 and the third region EB1 will be compared with each other with reference to FIGS. 6 and 7. In FIGS. 6 and 7, black linear portions extending in the left-right direction indicate the dielectric layers 20, and white linear portions extending in the left-right direction indicate the internal electrode layers 30. Further, black portions present in the middle of the white linear portions extending in the left-right direction each indicate a hollow portion V in which the metal material does not exist. Therefore, the coverage is higher with more white portions. As compared with FIG. 7, it can be confirmed that the hollow portions V are less in FIG. 6. Therefore, it can be confirmed that the coverage of the first middle region EA0 and the second middle region EB0 shown in FIG. 6 is higher than the coverage of the second region EA2 and the third region EB1 shown in FIG. 7.

Measurement of Various Parameters

Hereinafter, an example of a method of measuring various parameters will be described. Various parameters can be measured by the following method.

Method of Measuring Thickness of Internal Electrode Layer and Dielectric Layer

Hereinafter, an example of a method of measuring the thickness of the internal electrode layer 30 of the multilayer ceramic capacitor 1 in the lamination direction T will be described.

First, the multilayer ceramic capacitor 1 is polished from the first lateral surface WS1 or the second lateral surface WS2 to expose the LT cross section where the counter electrode portion 11E of the multilayer body 10 is exposed. If necessary, the exposed cross section of the observation position is etched to remove the internal electrode layer 30 stretched by polishing. Of the exposed cross sections, the measurement points M1 to M6 shown in FIG. 8 are observed using a scanning electron microscope (SEM). FIG. 8 is a view showing an example of an LT cross section of the multilayer ceramic capacitor 1, and is a view showing measurement points when measuring the thickness of the internal electrode layers 30 and the thickness of the dielectric layers 20. In addition, for example, in a case where only the first main surface-side inner layer portion 112 includes the above-described first middle region EA0 and the second middle region EB0 having a high coverage and a thick thickness, observation using SEM is performed with respect to the measurement points M1 to M3.

The measurement points M1 to M3 are set in the first main surface-side inner layer portion 112. The measurement point M1 is a portion including the first region EA1 of each of the first internal electrode layers 31 and the fourth region EB2 of each of the second internal electrode layers 32. The measurement point M2 is a portion including the first middle region EA0 of each of the first internal electrode layers 31 and the second middle region EB0 of each of the second internal electrode layers 32. The measurement point M3 is a portion including the second region EA2 of each of the first internal electrode layers 31 and the third region EB1 of each of the second internal electrode layers 32.

The measurement points M4 to M6 are set in the second main surface-side inner layer portion 113. The measurement point M4 is a portion including the first region EA1 of each of the first internal electrode layers 31 and the fourth region EB2 of each of the second internal electrode layers 32. The measurement point M5 is a portion including the first middle region EA0 of each of the first internal electrode layers 31 and the second middle region EB0 of each of the second internal electrode layers 32. The measurement point M6 is a portion including the second region EA2 of each of the first internal electrode layers 31 and the third region EB1 of each of the second internal electrode layers 32.

The measurement points M1 and M4 are set at the center position of the distance Le1 shown in FIGS. 2B and 8 in the length direction L. The measurement points M2 and M5 are set at the center position of the distance Le0 shown in FIGS. 2B and 8 in the length direction L. The measurement points M3 and M6 are set at the center position of the distance Le2 shown in FIGS. 2B and 8 in the length direction L.

Figure 9:
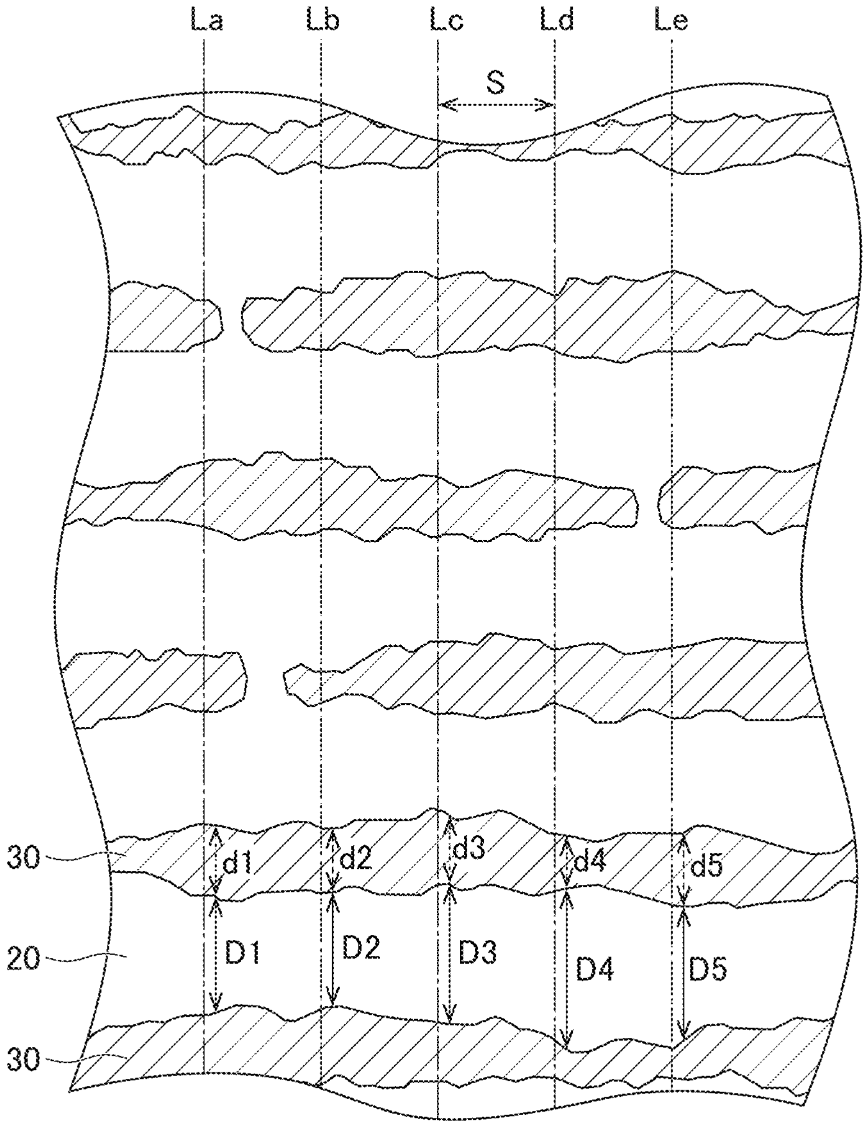
FIG. 9 is a view showing an example of an SEM enlarged image of an exposed cross section of an inner layer portion.

The observation magnification at the time of observing each measurement point is a magnification at which the four dielectric layers 20 and the five internal electrode layers 30 can be observed, and the dielectric layers 20 and the internal electrode layers 30 can be clearly distinguished from each other. FIG. 9 is a view showing an example of an SEM enlarged image of an exposed cross section of an inner layer portion at a measurement point.

When the thickness of each of the internal electrode layers 30 of the multilayer ceramic capacitor 1 is measured, as shown in FIG. 9, five straight lines La to Le extending in the lamination direction of the multilayer body 10 are drawn at equal intervals of the pitch S in the enlarged image of the cross section of the multilayer ceramic capacitor 1. The pitch S may be set to about 5 times to about 10 times the thickness of each of the internal electrode layers 30 to be measured and, for example, in a case of measuring an internal electrode having a thickness of about 0.5 μm, the pitch S is set to about 2.5 μm. Next, the thickness of each of the internal electrode layers 30 is measured on each of the straight lines La to Le. However, when the internal electrode layers are missing on each of the straight lines La to Le and the dielectric layers 20 sandwiching the internal electrode layer 30 are connected to each other, or when the enlarged image of the measurement position is unclear, a new straight line is drawn and the thickness of each of the internal electrode layers 30 is measured.

For example, when the thickness of each of the internal electrode layers 30 is measured, as shown in FIG. 9, the thickness d1 on the straight line La, the thickness d2 on the straight line Lb, the thickness d3 on the straight line Lc, the thickness d4 on the straight line Ld, and the thickness d5 on the straight line Le are measured. Then, for each of the measurement points in the first main surface-side inner layer portion 112 and the measurement points in the second main surface-side inner layer portion 113, the thickness of each of the five internal electrode layers 30 is measured by the above-described method, and the average value thereof is defined as the thickness of the internal electrode layer 30 of the present example embodiment. For example, when the thicknesses of the first middle region EA0 and the second middle region EB0 are measured, the thicknesses of 25 points of 5 locations×5 layers are measured at the measurement point M2, the thicknesses of 25 points of 5 locations×5 layers are measured at the measurement point M5, and an average value of 50 points in total is set as the thicknesses of the first middle region EA0 and the second middle region EB0 of the present example embodiment. For example, when the thicknesses of the first region EA1, the second region EA2, the third region EB1, and the fourth region EB2 are measured, at each of the measurement points M1, M3, M4, and M6, the thicknesses of 25 points of five locations×5 layers are measured, and the average value of the total of 100 points is set as the thicknesses of the first region EA1, the second region EA2, the third region EB1, and the fourth region EB2 of the present example embodiment.

The thickness of the dielectric layer 20 is also measured in the same or substantially the same manner as the internal electrode layer 30. When the thickness of the dielectric layer 20 is measured, as shown in FIG. 9, the thickness D1 on the straight line La, the thickness D2 on the straight line Lb, the thickness D3 on the straight line Lc, the thickness D4 on the straight line Ld, and the thickness D5 on the straight line Le are measured.

Then, for each of the measurement points in the first main surface-side inner layer portion 112 and the measurement points in the second main surface-side inner layer portion 113, the thickness of each of the four dielectric layers 20 is measured by the above-described method, and the average value thereof is set as the thickness of the dielectric layer 20 of the present example embodiment. The thickness of the dielectric layer 20 can be measured for each of the regions corresponding to the first middle region EA0 and the second middle region EB0, the regions corresponding to the first region EA1 and the fourth region EB2, and the regions corresponding to the second region EA2 and the third region EB1.

The polishing and the measurement are repeated, and the measurement can be performed at six measurement points M1 to M6 at three positions including the center position of the first lateral surface-side counter electrode portion 112E in the width direction W, the center position of the middle counter electrode portion 111E in the width direction W, and the center position of the second lateral surface-side counter electrode portion 113E in the width direction W, respectively.

Coverage Measurement Method

An example of a method of measuring coverage as a coverage ratio of the dielectric layer 20 with the internal electrode layer 30 will be described. In addition, the measurement of coverage in the present measurement method is also referred to as measurement of line coverage.

In the exposed LT cross section, line coverage is measured using an optical microscope. The measurement points at the time of measuring the line coverage conform to the measurement points M1 to M6 shown in FIG. 8. However, the observation magnification at the time of observing each measurement point is 1000 times.

As shown in FIGS. 6 and 7, the internal electrode layers 30 include regions in each of which an electrically conductive component exists and regions in each of which an electrically conductive component does not exist, such as the hollow portion V. In the optical microscope images shown in FIGS. 6 and 7, the line coverage is calculated as the ratio of the length in the length direction L of the region actually occupied by the electrically conductive component of the internal electrode layer 30 to the length in the length direction L of the internal electrode layers 30 when the presence or absence of the electrically conductive component is not considered, that is, the ratio of the length in the length direction L excluding the regions where the electrically conductive component is not present to the length in the length direction L of the internal electrode layer 30 when the presence or absence of the electrically conductive component is not considered. Then, the coverage of the internal electrode layer 30 is measured for each of the measurement points in the first main surface-side inner layer portion 112 and the measurement points in the second main surface-side inner layer portion 113, and the average value thereof is set as the coverage of the internal electrode layer 30 of the present example embodiment. For example, when the coverage of the first middle region EA0 and the second middle region EB0 is measured, the coverage of the internal electrode layer 30 is measured at each of the measurement point M2 and the measurement point M5, and the average value thereof is set as the coverage of the first middle region EA0 and the second middle region EB0 of the present example embodiment. For example, when the coverages of the first region EA1, the second region EA2, the third region EB1, and the fourth region EB2 are measured, the coverage of the internal electrode layer 30 is measured at each of the measurement points M1, M3, M4, and M6, and the average value thereof is set as the coverage of the first region EA1, the second region EA2, the third region EB1, and the fourth region EB2 of the present example embodiment.

Distance and Angle Measurement Method

Various distances and angles are measured using the exposed LT cross section described above. Distance and angle measurements are performed using a digital microscope.

Manufacturing Method

Next, an example of a method of manufacturing the multilayer ceramic capacitor 1 of the present example embodiment will be described. A manufacturing method of the multilayer ceramic capacitor 1 of the present example embodiment is not limited as long as the requirements described above are satisfied. However, a preferred manufacturing method includes the following steps. Details of each step will be described below.

A dielectric sheet for manufacturing the dielectric layer 20 and an electrically conductive paste for manufacturing the internal electrode layer 30 are prepared. The electrically conductive paste for manufacturing the dielectric sheet and the internal electrode contains a binder and a solvent. The binder and the solvent may be known.

The electrically conductive paste for manufacturing the internal electrode layer 30 is printed on the dielectric sheet in a predetermined pattern by, for example, screen printing or gravure printing. Thus, the dielectric sheet on which the pattern of the first internal electrode layer 31 and the pattern of the second internal electrode layer 32 are formed is prepared. The printing method is not limited to screen printing or the like.

Here, an example method of printing the electrically conductive paste for manufacturing the internal electrode layer 30 on the dielectric sheet will be described with reference to FIGS. 10 and 11.

Figure 11:
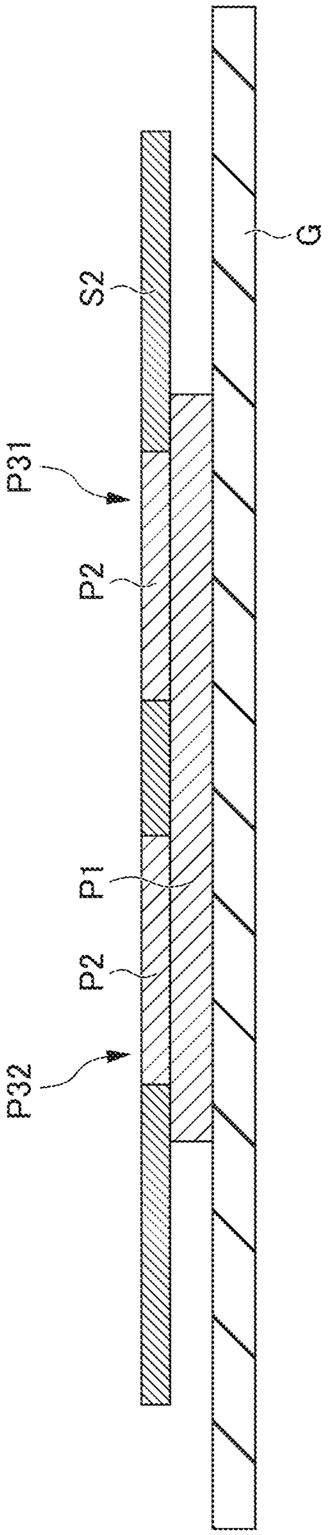
FIG. 11 is a schematic view of a cross section of a dielectric sheet in which the electrically conductive paste P2 is printed on the dielectric sheet of FIG. 10.

As shown in FIG. 11, the dielectric sheet on which the pattern of the internal electrode layer 30 is printed includes a ceramic green sheet G, and an electrically conductive paste P1 and an electrically conductive paste P2 provided on the ceramic green sheet G. The electrically conductive paste P1 and the electrically conductive paste P2 are formed by the hollow portion of a screen S1 and the hollow portion of a screen S2.

Figure 10:
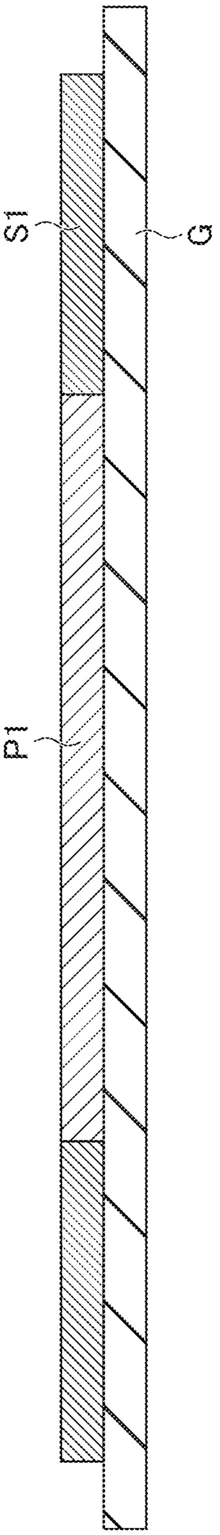
FIG. 10 is a schematic view of a cross section of a dielectric sheet on which an electrically conductive paste P1 is printed.

First, as shown in FIG. 10, the electrically conductive paste P1 is provided on the ceramic green sheet G by using the screen S1 having hollow portions formed in a pattern corresponding to the outer shapes of the first internal electrode layer 31 and the second internal electrode layer 32.

Next, as shown in FIG. 11, the electrically conductive paste P2 is screen-printed on the electrically conductive paste P1 using the screen S2 having hollow portions formed in a pattern corresponding to the first middle region EA0 and the second middle region EB0. Thus, the portions corresponding to the first middle region EA0 and the second middle region EB0 are thicker than the other regions. Here, for example, the right portion of the electrically conductive paste P1 and the electrically conductive paste P2 shown in FIG. 11 refers to a portion P31 defining and functioning as the first internal electrode layer 31 of the multilayer ceramic capacitor, and the left portion thereof refers to a portion P32 defining and functioning as the second internal electrode layer 32 of another multilayer ceramic capacitor. The dielectric sheet is thus prepared.

By laminating a predetermined number of dielectric sheets on which the pattern of the internal electrode layer 30 is not printed, a portion P12 defining and functioning as the first main surface-side outer layer portion 12 adjacent to the first main surface TS1 is formed.

Figure 12:
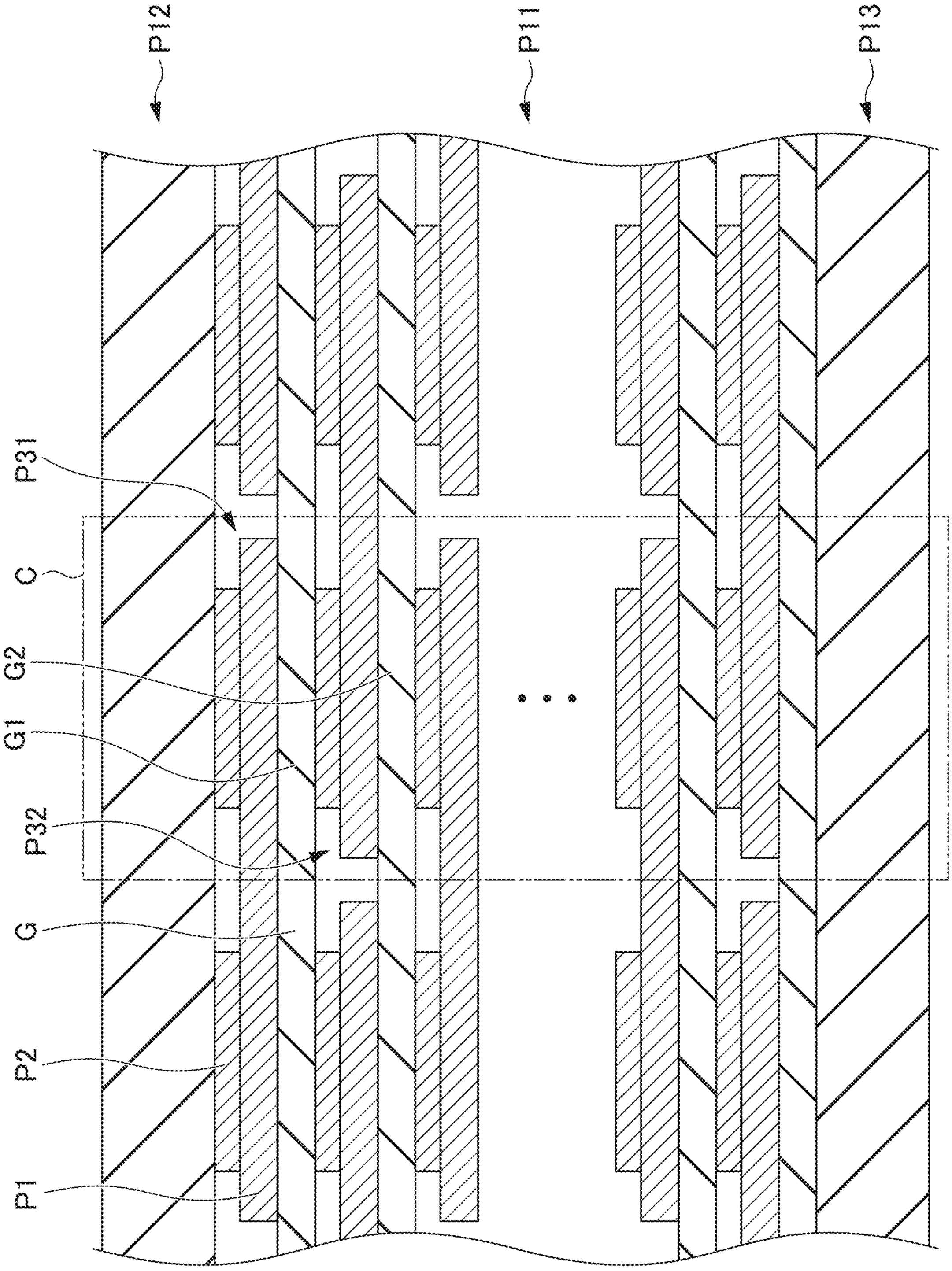
FIG. 12 is a schematic view of a portion of a multilayer sheet in which a portion functioning as a first main surface-side outer layer portion and a portion functioning as a second main surface-side outer layer portion are provided on and below a portion functioning as an inner layer portion.

Next, as shown in FIG. 12, a portion P11 defining and functioning as the inner layer portion 11 is formed by sequentially laminating the screen-printed dielectric sheets shown in FIG. 11 on the surface of the portion P12 defining and functioning as the first main surface-side outer layer portion 12. Here, specifically with reference to a portion surrounded by C in FIG. 12, the dielectric sheet G1 on which the electrically conductive paste P31 defining and functioning as the first internal electrode layer 31 is provided and the dielectric sheet G2 on which the electrically conductive paste P32 defining and functioning as the second internal electrode layer 32 is provided are sequentially and alternately laminated. The portion C in FIG. 12 is cut out in a subsequent step to form one multilayer chip.

A predetermined number of dielectric sheets on which the pattern of the internal electrode layer 30 is not printed are laminated on the surface of the portion P11 defining and functioning as the inner layer portion 11, such that a portion P13 defining and functioning as the second main surface-side outer layer portion 13 adjacent to the second main surface TS2 is formed. With such a manufacturing method above, a multilayer sheet is manufactured.

A multilayer block is manufactured by pressing a multilayer sheet in the height direction by, for example, isostatic pressing.

The multilayer chip is cut out by cutting the multilayer block into a predetermined size. At this time, corner portions and ridge portions of the multilayer chip may be rounded by barrel polishing or the like.

The multilayer chip is fired to manufacture the multilayer body 10. The firing temperature depends on the materials of the dielectric layer 20 and the internal electrode layer 30, but is, for example, preferably about 900° C. or more and about 1400° C. or less. Here, by adjusting the thickness of the electrically conductive paste for manufacturing the internal electrode layer 30 according to the region and adjusting the pressing condition and the firing condition, the multilayer body 10 having the structure of the internal electrode layer 30 and the surface shapes of the first main surface TS1 and the second main surface TS2 of the present example embodiment can be obtained. For example, by adjusting the coating state including the thickness of the electrically conductive paste for manufacturing the internal electrode layer 30 and the pressing conditions, the sloped portion such as the first sloped portion FA1 whose thickness gradually decreases is formed, such that the internal electrode layer 30 of the present example embodiment can be obtained.

An electrically conductive paste defining and functioning as a base electrode layer is applied to both end surfaces of the multilayer body 10.

In the present example embodiment, the electrically conductive paste is also applied to the first main surface TS1 and the second main surface TS2, and the first lateral surface WS1 and the second lateral surface WS2 of the multilayer body 10. At this time, the electrically conductive paste is applied so that the distance L1 between the first external electrode 40A and the second external electrode 40B is longer than the distance Lt0 in the length direction L of the first middle region EA0 and the second middle region EB0.

An example of a more specific manufacturing method will be described. The first main surface TS1 and the second main surface TS2 of the multilayer body 10 respectively include the first flat surface PA0 and the second flat surface PB0 corresponding to the positions of the first middle region EA0 and the second middle region EB0. In addition, the first sloped surface FC1, the second sloped surface FC2, the third sloped surface FC3, and the fourth sloped surface FC4 are formed on the periphery thereof. Further, the flat portions PA1, PA2, PB1, and PB2 are each provided closer to the end surface than each of the sloped surfaces.

Therefore, for example, the electrically conductive paste is applied to the flat portions PA1, PA2, PB1, and PB2, each of which is located closer to the end surface than each of the sloped surfaces. By applying the electrically conductive paste to the multilayer body 10 in this manner, the electrically conductive paste is applied so that the distance L1 between the first external electrode 40A and the second external electrode 40B is longer than the distance Lt0 in the length direction L of the first middle region EA0 and the second middle region EB0. The first sloped surface FC1, the second sloped surface FC2, the third sloped surface FC3, and the fourth sloped surface FC4 may be partially coated with an electrically conductive paste at a portion of each of them adjacent to the end surface.

The above method is one example of a manufacturing method, and the present invention is not limited thereto. The base electrode layer may also be adjusted by removal after the firing treatment.

In the present example embodiment, the base electrode layer is a fired layer. An electrically conductive paste including a glass component and a metal is applied to the multilayer body 10 by a method such as dipping, for example. Thereafter, a firing process is performed to form a base electrode layer. The temperature of the firing treatment at this time is, for example, preferably about 700° C. or more and about 900° C. or less.

When the multilayer chip before firing and the electrically conductive paste applied to the multilayer chip are fired at the same time, the fired layer is preferably formed by firing a material to which a ceramic material is added instead of a glass component. At this time, it is particularly preferable to use the same type of ceramic material as the dielectric layer 20 as the ceramic material to be added. In this case, an electrically conductive paste is applied to the multilayer chip before firing, and the multilayer chip and the electrically conductive paste applied to the multilayer chip are simultaneously fired to form the multilayer body 10 in which the fired layer is formed.

Thereafter, a plated layer is formed on the surface of the base electrode layer. In the present example embodiment, the first plated layer 60A is formed on the surface of the first base electrode layer 50A. A second plated layer 60B is formed on the surface of the second base electrode layer 50B. In the present example embodiment, a Ni plated layer and a Sn plated layer are formed as the plated layer. When plating is performed, for example, either electrolytic plating or electroless plating may be used. However, electroless plating requires pretreatment with a catalyst or the like in order to improve the plating deposition rate, and thus has a disadvantage that the process becomes complicated. Therefore, in general, electrolytic plating is preferably employed. The Ni plated layer and the Sn plated layer are sequentially formed by barrel plating, for example.

When the electrically conductive resin layer is provided as the base electrode layer, the electrically conductive resin layer may be provided so as to cover the fired layer. When the electrically conductive resin layer is provided, an electrically conductive resin paste containing a thermosetting resin and a metal component is applied onto the fired layer, and then heat-treated at a temperature of about 250° C. to about 550° C. or higher, for example. Thus, the thermosetting resin is thermally cured to form the electrically conductive resin layer. The atmosphere during this heat treatment is, for example, preferably an $N_2$ atmosphere. In addition, in order to prevent scattering of the resin and oxidation of various metal components, the oxygen concentration is preferably 100 ppm or less.

Through such a manufacturing process, the multilayer ceramic capacitor 1 is manufactured.

Experimental Example

Seven lots of multilayer ceramic capacitors manufactured by adjusting the thickness and coverage of the first middle region EA0 and the second middle region EB0 according to the manufacturing method described in the example embodiment were manufactured as samples of Experimental Examples 1 to 7. As samples of a Comparative Example, samples each having a uniform thickness and coverage of the internal electrode layer were prepared. Thereafter, capacitance evaluation and mounting evaluation were performed using the prepared samples. Specific thicknesses, coverages, evaluation results, and the like of the internal electrode layers of the Experimental Examples and the Comparative Example are described in Table 1 described below.

First, according to the manufacturing method described in the present example embodiment, multilayer ceramic capacitors including the following specifications were manufactured as samples of Experimental Examples.

Size of multilayer ceramic capacitor: size 1608

Capacitance: about 22 μF

Rated voltage: about 25 V

Dielectric layer: $BaTiO_3$ (thickness of dielectric layer: about 1 μm)

Internal electrode layer: Ni

Base electrode layer: electrode containing conductive metal (Cu) and glass component (the thickness of the base electrode layer provided on each of the first end face and the second end face: about 36 μm, the thickness of the base electrode layer provided on each of the first main surface, the second main surface, the first lateral surface, and the second lateral surface: about 9 μm)

Plated layer: two-layer formation of Ni plated layer (about 2 μm) and Sn plated layer (about 4 μm)

Internal electrode layer: Ni

Number of multilayer sheets: 550 layers

The ratio of the middle region (high coverage portion) in the counter portion: about 75%

Here, each lot is a lot manufactured under different manufacturing conditions, and the thickness and coverage of the first middle region EA0 and the second middle region EB0 were adjusted. For each of the Experimental Examples and the Comparative example, a required number of samples to be used for each evaluation was prepared. In addition, five samples for measuring the dimensions, the thicknesses of the internal electrode layers, and the coverage were prepared for each of Experimental Examples and a Comparative Example, and the average values of the measured values of the dimensions, the thicknesses of the internal electrode layers, and the coverage of the five samples were calculated as the values of the dimensions, the thicknesses of the internal electrode layers, and the coverage of each of the Experimental Examples and the Comparative Example.

Method of Measuring Capacitance

The capacitance obtained under the conditions of a frequency of about 120 Hz and an applied voltage of about 0.5 Vrms was measured using a C meter. For each of the Experimental Examples and the Comparative Example, 50 samples were evaluated, and the average values thereof were used as the capacitance of each of the Experimental Examples and the Comparative Example.

Mounting Evaluation

The rate of occurrence of the suction failure caused by the mounter of the mounting machine when the multilayer ceramic capacitors were mounted on the mounting substrate was evaluated. For each of the Experimental Examples and the Comparative Example, 50 samples were evaluated.

Table 1 shows measurement results and evaluation results of the Experimental Examples 1 to 7 and the Comparative Example.

TABLE 1

| | COMPARATIVE EXAMPLE | EXPERIMENTAL EXAMPLE 1 | EXPERIMENTAL EXAMPLE 2 | EXPERIMENTAL EXAMPLE 3 | EXPERIMENTAL EXAMPLE 4 | EXPERIMENTAL EXAMPLE 5 | EXPERIMENTAL EXAMPLE 6 | EXPERIMENTAL EXAMPLE 7 |
|---|---|---|---|---|---|---|---|---|
| MIDDLE REGION THICKNESS te0 (μm) | 0.62 | 0.63 | 0.64 | 0.65 | 0.66 | 0.67 | 0.69 | 0.70 |
| COUNTER PORTION END REGION THICKNESS te1 (μm) | 0.62 | 0.62 | 0.62 | 0.62 | 0.61 | 0.61 | 0.62 | 0.62 |

TABLE 1-continued

| | COMPARATIVE EXAMPLE | EXPERIMENTAL EXAMPLE 1 | EXPERIMENTAL EXAMPLE 2 | EXPERIMENTAL EXAMPLE 3 | EXPERIMENTAL EXAMPLE 4 | EXPERIMENTAL EXAMPLE 5 | EXPERIMENTAL EXAMPLE 6 | EXPERIMENTAL EXAMPLE 7 |
|---|---|---|---|---|---|---|---|---|
| THICKNESS RATIO te0/te1 (%) | 100.0% | 101.6% | 103.2% | 104.8% | 108.2% | 109.8% | 111.3% | 112.9% |
| MIDDLE REGION COVERAGE Ce0 (%) | 87.8 | 90.4 | 92.5 | 94.6 | 96.1 | 97.5 | 98.3 | 99.2 |
| COUNTER PORTION END REGION COVERAGE Ce1 (%) | 87.8 | 88.2 | 88.0 | 88.4 | 86.1 | 86.1 | 88.2 | 88.2 |
| COVERAGE DIFFERENCE Ce2 − Ce1 (% pt) | 0.0 | 2.2 | 4.5 | 6.2 | 10.0 | 11.4 | 10.1 | 11.0 |
| MULTILAYER BODY SWELLING DIMENSION (ONE SIDE) (μm) | 0.0 | 2.9 | 5.3 | 7.7 | 10.2 | 12.6 | 14.8 | 19.8 |
| MULTILAYER BODY SWELLING RATE (%) | 100.0% | 100.6% | 101.1% | 101.7% | 102.2% | 102.7% | 103.2% | 104.3% |
| MAIN SURFACE-SIDE THICKNESS OF EXTERNAL ELECTRODE (μm) | 15.2 | 15.2 | 15.4 | 14.9 | 15.3 | 15.0 | 15.1 | 15.5 |
| CAPACITANCE (μF) | 21.6 | 22.0 | 22.3 | 22.6 | 23.2 | 23.5 | 23.3 | 23.4 |
| CAPACITANCE EVALUATION RESULT | x | ○ | ○ | ○ | ○ | ○ | ○ | ○ |
| DIMENSION EVALUATION RESULT | ○ | ○ | ○ | ○ | ○ | ○ | ○ | Δ |
| SUCTION FAILURE OCCURRENCE RATE IN MOUNTING EVALUATION | 0/50 | 0/50 | 0/50 | 0/50 | 0/50 | 0/50 | 2/50 | 13/50 |
| SUCTION FAILURE EVALUATION RESULT | ○ | ○ | ○ | ○ | ○ | ○ | Δ | Δ |
| COMPREHENSIVE RESULT | x | ○ | ○ | ○ | ○ | ○ | Δ | Δ |

In Table 1, the measurement results are provided in the following lists including middle region thickness te0, counter portion end region thickness te1, thickness ratio te0/te1, middle region coverage Ce0, counter portion end region coverage Ce1, coverage difference Ce0-Ce1, multilayer body swelling dimension (one side), multilayer body swelling rate, and main surface-side thickness of the external electrode. The evaluation results are provided in the following lists including capacitance, capacitance evaluation result, dimension evaluation result, suction failure occurrence rate in mounting evaluation, suction failure evaluation result, and comprehensive evaluation.

In Table 1, the middle region thickness te0 is an average value of the measurement results of the thicknesses of the first middle region EA0 and the second middle region EB0. The counter portion end region thickness te1 is an average value of the measurement results of the thicknesses of the first region EA1, the second region EA2, the third region EB1, and the fourth region EB2. The thickness ratio is a numerical value obtained by dividing the middle region thickness te0 by the counter portion end region thickness te1.

In Table 1, the middle region coverage Ce0 is an average value of the measurement results of the coverage of the first middle region EA0 and the second middle region EB0. The counter portion end region coverage Ce1 is an average value of the measurement results of the coverage of the first region EA1, the second region EA2, the third region EB1, and the fourth region EB2. The coverage difference is a numerical value obtained by subtracting the counter portion end region coverage Ce1 from the middle region coverage Ce0, and is expressed as a percentage point (% pt).

In Table 1, the swelling dimension (one side) of the multilayer body is an average value of the raised height tf of the first flat surface PA0 provided by the first sloped surface FC1 and the second sloped surface FC2 and the raised height tf of the second flat surface PB0 provided by the third sloped surface FC3 and the fourth sloped surface FC4. The multilayer body swelling ratio is a numerical value obtained by dividing the distance T0 in the lamination direction T at the center in the length direction L of the exposed portion Ep of the multilayer body 10 by the maximum distance T1 in the lamination direction T between the first main surface TS1-side surface (the flat portion PA1, the flat portion PA2) and the second main surface TS2-side surface (the flat portion PB1, the flat portion PB2) of each of the first covered portion C1 and the second covered portion C2. In the Experimental Examples, the above-described maximum distance T1 was 930 μm on average. The main surface-side thickness of the external electrode is an average value of the thickness of the first external electrode provided on the first main surface TS1, the thickness of the second external electrode provided on the first main surface TS1, the thickness of the first external electrode provided on the second main surface TS2, and the thickness of the second external electrode provided on the second main surface TS2.

In the entry of capacitance in Table 1, the capacitance of the multilayer ceramic capacitor measured by the above-described capacitance measurement method is shown. In the entry of capacitance evaluation result, in the experimental examples, the evaluation result was set as o (circle symbol) in the case of about 22.0 μF or more, and the evaluation result was set as x (cross symbol) in the case of less than about 22.0 μF.

In the entry of dimension evaluation result in Table 1, when the thickness of the first middle region EA0 and the second middle region EB0 is increased so that the first flat surface PA0 and the second flat surface PB0 protrude outward from the first external electrode 40A or the second external electrode 40B in the lamination direction T, the evaluation result was set as A (triangle symbol), and when they do not protrude outward, the evaluation result was set as o (circle symbol).

In the entry of suction failure occurrence rate in mounting evaluation in Table 1, the occurrence rate of the suction failure due to the mounter of the mounting machine at the time of mounting 50 multilayer ceramic capacitors in each of the Comparative Example and the Experimental Examples 1 to 7 is described. In the entry of suction failure evaluation result, when the number of samples in which the suction failure occurred was 1 or less among the 50 samples, the evaluation result was set as o (circle symbol), when the number of samples in which the suction failure occurred was 2 or more and 15 or less, the evaluation result was set as Δ (triangle symbol), and when the number of samples in which the suction failure occurred was more than 15, the evaluation result was set as x (cross symbol). In the Experimental Examples, the number of samples in which the suction failure occurred was 15 or less in any of the Experimental Examples.

In the entry of comprehensive evaluation in Table 1, the evaluation result was set as Δ (triangle symbol) indicating fair when any of the evaluation results included Δ (triangle symbol) indicating fair, the evaluation result was set as x (cross symbol) indicating poor when any of the evaluation results included x (cross symbol) indicating poor, and the evaluation result was set as o (circle symbol) indicating good when all of the evaluation results were o (circle symbol) indicating good.

It was confirmed that the capacitance was about 22.0 μF or more when the coverage difference was about 2.2 percentage point or more, and the effect of improving the capacitance was obtained. From the trend obtained from the results, for example, if the coverage difference is about 3.0 percentage points or more, a high advantageous effect is expected on the capacitance increase, and if the coverage difference is about 4.0 percentage points or more, a higher advantageous effect is expected. From the trend of the evaluation results of the Comparative Example and the Experimental Examples, it was confirmed that the advantageous effect of the present example embodiment was obtained by making the middle region coverage Ce0 higher than the counter portion end region coverage Ce1, and that the capacitance was higher as the middle region coverage Ce0 was made higher than the counter portion end region coverage Ce1.

It was confirmed that, when the thickness ratio was 101.6% or more, the capacitance was about 22.0 μF or more, and the advantageous effect of improving the capacitance was obtained. From the trend obtained from the results, it is expected that the thickness ratio is, for example, about 102% or more, and more preferably about 103% or more. Thus, the coverage of the middle portion can be increased, and the capacitance can be increased. Further, the thickness ratio may be about 111.3% or less or about 109.8% or less. From the trend of the evaluation results of the Comparative Example and the Experimental Examples, it was confirmed that the advantageous effect of the present example embodiment was obtained by making the middle region thickness te0 higher than the counter portion end region thickness te1, and that the capacitance was higher as the middle region thickness te0 was made higher than the counter portion end region thickness te1.

When the thickness ratio exceeds about 109.8%, the advantageous effect of improving capacitance is limited. In addition, when the thickness ratio is too high, the dimension of the middle region of the multilayer body becomes large, and the swelling dimension (one side) of the multilayer body becomes close to the main surface-side thickness of the external electrode, such that it becomes difficult to maintain the dimension of the entire multilayer ceramic capacitor 1 to be small, and the suction failure in the mounting evaluation easily occurs. Therefore, when the thickness ratio is too high, the advantageous effect of improving the capacitance is reduced, and depending on the dimension of the product or the thickness of the external electrode, it may be difficult to adopt the product.

Here, in the samples of the Comparative Example, the first sloped portion FA1, the second sloped portion FA2, the third sloped portion FB1, and the fourth sloped portion FB2 of the present example embodiment were not confirmed; whereas, in the samples of the Experimental Examples 1 to 7, the first sloped portion FA1, the second sloped portion FA2, the third sloped portion FB1, and the fourth sloped portion FB2 of the present example embodiment were confirmed. With such a configuration, good evaluation results are obtained in the above-described evaluation.

In addition, in the samples of the Experimental Examples 1 to 7, it was confirmed that the distance of the first middle region EA0 or the second middle region EB0 in the length direction L was shorter than the distance between the first external electrode 40A and the second external electrode 40B. With such a configuration, good evaluation results are obtained in the above-described evaluation.

In addition, in the samples of the Experimental Examples 1 to 7, it was confirmed that the distance T0 in the lamination direction T at the center in the length direction L of the exposed portion Ep of the multilayer body 10 was longer than the maximum distance T1 in the lamination direction T between the first main surface TS1-side surface and the second main surface TS2-side surface of each of the first covered portion C1 and the second covered portion C2. With such a configuration, good evaluation results are obtained in the above-described evaluation.

In addition, in the samples of the Experimental Examples 1 to 6, it was confirmed that the distance T0 in the lamination direction T at the center in the length direction L of the exposed portion Ep of the multilayer body 10 was shorter than the maximum distance T2 in the lamination direction T between the first main surface TS1-side surface and the second main surface TS2-side surface of each of the first external electrode 40A and the second external electrode 40B. Each of the first main surface TS1-side surface and the second main surface TS2-side surface functions as an outermost surface and is exposed to the outside. With such a configuration, good evaluation results are obtained in the above-described evaluation. The swelling dimension (one side) of the multilayer body is preferably smaller than the main surface-side thickness of the external electrode.

The multilayer ceramic capacitor 1 according to the example embodiment described above has the following advantageous effects. In typical multilayer ceramic capacitors, a space exists in a portion between a surface of the multilayer body and a virtual plane connecting a surface of the first external electrode and a surface of the second external electrode. This space is always present as long as the external electrode has a lateral surface thickness; however, this space does not contribute to the capacitance density.

One method of improving the capacitance is to improve the coverage of the internal electrode layers to improve the net effective surface. Here, since there is a positive correlation between the coverage of the internal electrode layer and the thickness of the internal electrode layer, it is necessary to increase the thickness of the internal electrode layer in order to improve the coverage. Therefore, in order to design the multilayer body with the same dimension in the lamination direction T, it is necessary to reduce the number of the internal electrode layers by the amount of thickening the internal electrode layers. Therefore, the effect of increasing the capacitance by increasing the thickness of the internal electrode layer is canceled by the decrease in the number of internal electrode layers.

According to the example embodiments of the present disclosure, it is possible to provide multilayer ceramic capacitors that are able to increase the capacitance without increasing the size of the multilayer ceramic capacitor 1 by effectively utilizing the space present in the portion between the surface of the multilayer body and the virtual plane connecting the surface of the first external electrode and the surface of the second external electrode.

An multilayer ceramic capacitor 1 according to an example embodiment includes the multilayer body 10 including the plurality of dielectric layers 20 that are laminated, the first main surface TS1 and the second main surface TS2 opposed to each other in the lamination direction T, the first lateral surface WS1 and the second lateral surface WS2 opposed to each other in the width direction W orthogonal or substantially orthogonal to the lamination direction T, and the first end surface LS1 and the second end surface LS2 opposed to each other in the length direction L orthogonal or substantially orthogonal to the lamination direction T and the width direction W, the plurality of first internal electrode layers 31 each on a corresponding one of the plurality of dielectric layers 20 and each exposed at the first end surface LS1, the plurality of second internal electrode layers 32 each on a corresponding one of the plurality of dielectric layers 20 and each exposed at the second end surface LS2, the first external electrode 40A that is on the first end surface LS1 and connected to the plurality of first internal electrode layers 31, and the second external electrode 40B that is on the second end surface LS2 and connected to the plurality of second internal electrode layers 32. The multilayer body 10 includes the exposed portions Ep each exposed from the first external electrode 40A and the second external electrode 40B, the first covered portions C1 each covered by the first external electrode 40A, and the second covered portions C2 each covered by the second external electrode 40B; each of the plurality of first internal electrode layers 31 includes the first counter portion EA opposed to a corresponding one of the plurality of second internal electrode layers 32 and the first extension portion D1 extending from the first counter portion EA toward the first end surface LS1 and exposed at the first end surface LS1; each of the plurality of second internal electrode layers 32 includes the second counter portion EB opposed to a corresponding one of the plurality of first internal electrode layers 31 and the second extension portion D2 extending from the second counter portion EB toward the second end surface LS2 and exposed at the second end surface LS2; the first counter portion EA includes the first region EA1 adjacent to the first end surface LS1, the second region EA2 adjacent to the second end surface LS2, and the first middle region EA0 located between the first region EA1 and the second region EA2 and including coverage higher than coverage of the first region EA1 and coverage of the second region EA2; the second counter portion EB includes the third region EB1 adjacent to the second end surface LS2, the fourth region EB2 adjacent to the first end surface LS1, and the second middle region EB0 located between the third region EB1 and the fourth region EB2 and including coverage higher than coverage of the third region EB1 and coverage of the fourth region EB2; a length of the first middle region EA0 in the length direction is shorter than a distance between the first external electrode 40A and the second external electrode 40B, a length of the second middle region EB0 in the length direction is shorter than the distance between the first external electrode 40A and the second external electrode 40B, and the distance T0 in the lamination direction T at the center of each of the exposed portions Ep in the length direction L is longer than the maximum distance T1 in the lamination direction T between surfaces adjacent to the first main surface TS1 and the second main surface TS2 of each of the first covered portions C1 and the second covered portions C2, and shorter than the maximum distance T2 in the lamination direction T between the first main surface TS1-side surface and the second main surface TS2-side surface of each of the first external electrode 40A and the second external electrode 40B, the first main surface-side surface and the second main surface-side surface each defining and functioning as an outermost surface and being exposed to outside.

With such a configuration, it is possible to provide the multilayer ceramic capacitor 1 that is able to increase the capacitance without increasing the size of the multilayer ceramic capacitor.

In addition, in a multilayer ceramic capacitor 1 according to an example embodiment, the first main surface TS1 includes the first exposed surface EpsA exposed from the first external electrode 40A and the second external electrode 40B, the first covered surface C1*s*A covered by the first external electrode 40A, and the second covered surface C2*s*A covered by the second external electrode 40B, and the first exposed surface EpsA includes the first flat surface PA0 parallel to the lamination direction T, the first sloped surface FC1 coupling the first flat surface PA0 and the first covered surface C1sA and the second sloped surface FC2 coupling the first flat surface PA0 and the second covered surface C2sA.

With such a configuration, the areas of the first middle region EA0 and the second middle region EB0 having high coverage can be easily maintained corresponding to the first flat surface PA0, and it is possible to increase the capacitance without increasing the size of the multilayer ceramic capacitor 1.

In a multilayer ceramic capacitor 1 according to an example embodiment, the distance Lt1 in the length direction L of the first sloped surface FC1 and the distance Lt2 in the length direction L of the second sloped surface FC2 are shorter than the distance Lt0 in the length direction of the first flat surface PA0.

With such a configuration, the areas of the first middle region EA0 and the second middle region EB0 having high coverage can be easily maintained corresponding to the first flat surface PA0, and it is possible to further increase the capacitance without increasing the size of the multilayer ceramic capacitor 1.

In a multilayer ceramic capacitor 1 according to an example embodiment, the thickness of each of the first middle region EA0 and the second middle region EB0 is about 101.6% or more and about 111.3% or less of the thickness of each of the first region EA1, the second region EA2, the third region EB1, and the fourth region EB2, and the difference between the coverage of each of the first middle region EA0 and the second middle region EB0 and the coverage of each of the first region EA1, the second region EA2, the third region EB1, and the fourth region EB2 is about 2.2 percentage points or more.

With such a configuration, it is possible to provide the multilayer ceramic capacitor 1 that is able to increase the capacitance without increasing the size of the multilayer ceramic capacitor 1.

In a multilayer ceramic capacitor 1 according to an example embodiment, the thickness of each of the first middle region EA0 and the second middle region EB0 is about 101.6% or more and about 109.8% or less of the thickness of each of the first region EA1, the second region EA2, the third region EB1, and the fourth region EB2.

With such a configuration, it is possible to provide the multilayer ceramic capacitor 1 that is able to increase the capacitance without increasing the size of the multilayer ceramic capacitor 1.

In a multilayer ceramic capacitor according to an example embodiment, the difference between the coverage of each of the first middle region EA0 and the second middle region EB0 and the coverage of each of the first region EA1, the second region EA2, the third region EB1, and the fourth region EB2 is about 2.2 percentage points or more and about 11.4 percentage points or less.

With such a configuration, it is possible to provide the multilayer ceramic capacitor 1 that is able to increase the capacitance without increasing the size of the multilayer ceramic capacitor 1.

In a multilayer ceramic capacitor 1 according to an example embodiment, the first counter portion EA includes the first region EA1 adjacent to the first end surface LS1, the second region EA2 adjacent to the second end surface LS2, and the first middle region EA0 that is located between the first region EA1 and the second region EA2, disposed more toward the outside of the multilayer body 10 than the first region EA1 and the second region EA2 in the lamination direction T, and includes higher coverage than the coverage of the first region EA1 and the coverage of the second region EA2, the second counter portion EB includes the third region EB1 adjacent to the second end surface LS2, the fourth region EB2 adjacent to the first end surface LS1, and the second middle region EB0 that is located between the third region EB1 and the fourth region EB2, disposed more toward the outside of the multilayer body 10 than the third region EB1 and the fourth region EB2 in the lamination direction T, and includes higher coverage than the coverage of the third region EB1 and the coverage of the fourth region EB2, each of the first internal electrode layers 31 further includes the first sloped portion FA1 coupling the first region EA1 and the first middle region EA0 and the second sloped portion FA2 coupling the second region EA2 and the first middle region EA0, and each of the second internal electrode layers 32 further includes the third sloped portion FB1 coupling the third region EB1 and the second middle region EB0, and the fourth sloped portion FB2 coupling the fourth region EB2 and the second middle region EB0.

With such a configuration, it is possible to provide a multilayer ceramic capacitor that is able to increase the capacitance without increasing the size of the multilayer ceramic capacitor.

In a multilayer ceramic capacitor 1 according to an example embodiment, the first internal electrode layers 31 each further include the fifth sloped portion FA3 located at the first extension portion D1, and the second internal electrode layers 32 each further include the sixth sloped portion FB3 located at the second extension portion D2.

With such a configuration, it is possible to maintain a long distance of the intrusion path of moisture from the outside, such that it is possible to increase the capacitance and to maintain moisture resistance without increasing the size of the multilayer ceramic capacitor 1.

In a multilayer ceramic capacitor 1 according to an example embodiment, the slope angle θ of each of the first sloped portion FA1 and the second sloped portion FA2 is smaller than the slope angle θ2 of the fifth sloped portion FA3, and the slope angle θ of each of the third sloped portion FB1 and the fourth sloped portion FB2 is smaller than the slope angle θ2 of the sixth sloped portion FB3.

With such a configuration, it is possible to maintain a long distance of the intrusion path of moisture from the outside, such that it is possible to increase the capacitance and to maintain moisture resistance without increasing the size of the multilayer ceramic capacitor 1.

In a multilayer ceramic capacitor 1 according to an example embodiment, the level difference distance 1s1 in the lamination direction T between the first region EA1 and the first middle region EA0 generated by the first sloped portion FA1 is greater than the thickness Tc of the dielectric layer 20 provided between the first internal electrode layer 31 and the second internal electrode layer 32 in the lamination direction T, and the level difference distance 1s3 in the lamination direction T between the third region EB1 and the second middle region EB0 generated by the third sloped portion FB1 is greater than the thickness Tc of the dielectric layer 20 provided between the first internal electrode layer 31 and the second internal electrode layer 32 in the lamination direction T.

With such a configuration, the thickness Te of the internal electrode layer 30 in each of the first middle region EA0 and the second middle region EB0 can be increased to sufficiently increase the coverage by making use of the level difference due to the sloped portion, such that it is possible to further increase the capacitance without increasing the size of the multilayer ceramic capacitor 1.

In a multilayer ceramic capacitor 1 according to an example embodiment, the level difference distance 1*s*1 in the lamination direction T between the first region EA1 and the first middle region EA0 generated by the first sloped portion FA1 is greater than the sum Tt of the thickness Te of the first internal electrode layer 31 or the second internal electrode layer 32 in the lamination direction T and the thickness Tc of the dielectric layer 20, and the level difference distance 1*s*3 in the lamination direction T between the third region EB1 and the second middle region EB0 generated by the third sloped portion FB1 is greater than the sum Tt of the thickness Te of the first internal electrode layer 31 or the second internal electrode layer 32 in the lamination direction T and the thickness Tc of the dielectric layer 20.

With such a configuration, the thickness Te of the internal electrode layer in each of the first middle region EA0 and the second middle region EB0 can be increased to sufficiently increase the coverage by making use of the level difference due to the sloped portion, and it is possible to further increase the capacitance without increasing the size of the multilayer ceramic capacitor 1.

In a multilayer ceramic capacitor 1 according to an example embodiment, the first middle region EA0, the first region EA1, and the second region EA2 each include a portion parallel or substantially parallel to a plane orthogonal or substantially orthogonal to the lamination direction T, and the second middle region EB0, the third region EB1, and the fourth region EB2 each include a portion parallel or substantially parallel to a plane orthogonal or substantially orthogonal to the lamination direction T.

With such a configuration, it is possible to reduce or prevent the formation of a portion having a locally large size, and it is possible to increase the capacitance without increasing the size of the multilayer ceramic capacitor 1.

In a multilayer ceramic capacitor 1 according to an example embodiment, the distance Le3 in the length direction L of the first sloped portion FA1 and the distance Le4 in the length direction L of the second sloped portion FA2 are shorter than the distance Le0 in the length direction L of the first middle region EA0, and the distance Le4 in the length direction L of the third sloped portion FB1 and the distance Le3 in the length direction L of the fourth sloped portion FB2 are shorter than the distance Le0 in the length direction L of the second middle region EB0.

With such a configuration, since the areas of the first middle region EA0 and the second middle region EB0 each having high coverage can be maintained, it is possible to further increase the capacitance without increasing the size of the multilayer ceramic capacitor 1.

In a multilayer ceramic capacitor 1 according to an example embodiment, the thickness of the first sloped portion FA1 gradually decreases toward the first end surface LS1, the thickness of the second sloped portion FA2 gradually decreases toward the second end surface LS2, the thickness of the third sloped portion FB1 gradually decreases toward the second end surface LS2, and the thickness of the fourth sloped portion FB2 gradually decreases toward the first end surface LS1.

If there is a portion where the thickness of the internal electrode layer 30 rapidly changes, there is a possibility that a portion is formed where the distance between the internal electrode layers sandwiching the dielectric layer 20 is locally short. In this case, since the electric field concentrates on the portion, the reliability of the multilayer ceramic capacitor 1 may be lowered. However, with the above configuration, since it is possible to reduce or prevent the formation of the portion where the distance between the internal electrode layers is locally short in the vicinity of the sloped portion, it is possible to reduce or prevent the decrease in the reliability of the multilayer ceramic capacitor 1 due to electric field concentration while increasing the capacitance without increasing the size of the multilayer ceramic capacitor 1. In addition, since it is possible to reduce or prevent stress concentration in the sloped portion, it is possible to increase the capacitance without increasing the size of the multilayer ceramic capacitor 1, and it is possible to further reduce or prevent the occurrence of cracks in the multilayer body.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers that are laminated, a first main surface and a second main surface opposed to each other in a lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction;

a plurality of first internal electrode layers each on a corresponding one of the plurality of dielectric layers and each exposed at the first end surface;

a plurality of second internal electrode layers each on a corresponding one of the plurality of dielectric layers and each exposed at the second end surface;

a first external electrode on the first end surface and connected to the plurality of first internal electrode layers; and a second external electrode on the second end surface and connected to the plurality of second internal electrode layers; wherein the multilayer body includes exposed portions each exposed from the first external electrode and the second external electrode, first covered portions each covered by the first external electrode, and second covered portions each covered by the second external electrode;

each of the plurality of first internal electrode layers includes a first counter portion opposed to a corresponding one of the plurality of second internal electrode layers and a first extension portion extending from the first counter portion toward the first end surface and exposed at the first end surface;

each of the plurality of second internal electrode layers includes a second counter portion opposed to a corresponding one of the plurality of first internal electrode layers and a second extension portion extending from the second counter portion toward the second end surface and exposed at the second end surface;

the first counter portion includes:

a first region adjacent to the first end surface;

a second region adjacent to the second end surface; and a first middle region between the first region and the second region and including coverage higher than coverage of the first region and coverage of the second region;

the second counter portion includes:

a third region adjacent to the second end surface;

a fourth region adjacent to the first end surface; and a second middle region between the third region and the fourth region and including coverage higher than coverage of the third region and coverage of the fourth region;

a dimension of the first middle region in the length direction is shorter than a distance between the first external electrode and the second external electrode;

a dimension of the second middle region in the length direction is shorter than the distance between the first external electrode and the second external electrode; and a dimension in the lamination direction at a center of each of the exposed portions in the length direction is longer than a maximum distance in the lamination direction between surfaces adjacent to the first main surface and the second main surface of each of the first covered portions and the second covered portions, and shorter than a maximum distance in the lamination direction between a first main surface-side surface and a second main surface-side surface of each of the first external electrode and the second external electrode, the first main surface-side surface and the second main surface-side surface each functioning as an outermost surface and being exposed to outside;

the first counter portion of at least one of the plurality of first internal electrodes that is closest to one of the first and second main surfaces in the lamination direction includes the first region, the second region, and the first middle region; and the second counter portion of at least one of the plurality of second internal electrodes that is closest to one of the first and second main surfaces in the lamination direction includes the third region, the fourth region, and the second middle region.

2. The multilayer ceramic capacitor according to claim 1, wherein the first main surface includes a first exposed surface exposed from the first external electrode and the second external electrode, a first covered portion covered by the first external electrode, and a second covered surface covered by the second external electrode, and the first exposed surface includes a first flat surface parallel or substantially parallel to the lamination direction, a first sloped surface coupling the first flat surface and the first covered surface, and a second sloped surface coupling the first flat surface and the second covered surface.

3. The multilayer ceramic capacitor according to claim 2, wherein a length of the first sloped surface in the length direction and a length of the second sloped surface in the length direction are shorter than a length of the first flat surface in the length direction.

4. The multilayer ceramic capacitor according to claim 1, wherein a dimension of the multilayer body in the length direction is about 0.2 mm or more and about 6 mm or less;

a dimension of the multilayer body in the lamination direction is about 0.05 mm or more and about 5 mm or less; and a dimension of the multilayer body in the width direction is about 0.1 mm or more and about 5 mm or less.

5. The multilayer ceramic capacitor according to claim 1, wherein each of the plurality of dielectric layers includes $BaTiO_3$, $CaTiO_3$, $SrTiO_3$, or $CaZrO_3$ as a main component.

6. The multilayer ceramic capacitor according to claim 5, wherein each of the plurality of dielectric layers includes a Mn compound, an Fe compound, a Cr compound, a Co compound, or a Ni compound as a secondary component.

7. The multilayer ceramic capacitor according to claim 1, wherein a thickness of each of the plurality of dielectric layers is about 0.2 μm or more and about 10 μm or less.

8. The multilayer ceramic capacitor according to claim 1, wherein a number of the plurality of dielectric layers is fifteen or more and 1200 or less.

9. The multilayer ceramic capacitor according to claim 1, wherein each of the plurality of first and second internal electrodes includes Ni, Cu, Ag, Pd or Au, or an alloy including at least one of Ni, Cu, Ag, Pd or Au.

10. The multilayer ceramic capacitor according to claim 1, wherein a thickness of each of the plurality of first and second internal electrodes is about 0.2 μm or more and about 2.0 μm or less.

11. The multilayer ceramic capacitor according to claim 1, wherein a number of the plurality of first and second internal electrodes is fifteen or more and 1000 or less.

12. The multilayer ceramic capacitor according to claim 1, wherein the first external electrode includes a first base electrode layer and a first plated layer; and the second external electrode includes a second base electrode layer and a second plated layer.

13. The multilayer ceramic capacitor according to claim 12, wherein each of the first and second base electrode layers is a fired layer including a metal component and a glass component or a ceramic component.

14. The multilayer ceramic capacitor according to claim 13, wherein the metal component is at least one of Cu, Ni, Ag, Pd, Ag—Pd alloys, or Au.

15. The multilayer ceramic capacitor according to claim 13, wherein the ceramic component includes at least one of $BaTiO_3$, $CaTiO_3$, (Ba, Ca) $TiO_3$, $SrTiO_3$, or $CaZrO_3$.

16. The multilayer ceramic capacitor according to claim 12, wherein a thickness of each of the first and second base electrode layers is about 3 μm or more and about 200 μm or less in a middle of the respective first and second base electrode layers.

17. The multilayer ceramic capacitor according to claim 12, wherein each of the first and second plated layers includes at least one of Cu, Ni, Sn, Ag, Pd, a Ag—Pd alloy, or Au.

18. The multilayer ceramic capacitor according to claim 12, wherein each of the first and second plated layers includes a plurality of layers.

19. The multilayer ceramic capacitor according to claim 12, wherein each of the first and second plated layers has a two-layer structure including a Ni plated layer and a Sn plated layer on the Ni plated layer.

20. The multilayer ceramic capacitor according to claim 19, wherein a thickness of each of the Ni plated layer and the Sn plated layer is about 2 μm or more and about 10 μm or less.

* * * * *